(12) United States Patent
Terasaki et al.

(10) Patent No.: US 11,868,967 B2
(45) Date of Patent: Jan. 9, 2024

(54) SCHEDULE CREATION ASSISTING DEVICE AND SCHEDULE CREATION ASSISTING METHOD

(71) Applicant: HITACHI, LTD., Tokyo (JP)

(72) Inventors: Kohei Terasaki, Tokyo (JP); Jun Ogawa, Tokyo (JP); Keisuke Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 180 days.

(21) Appl. No.: 17/441,863

(22) PCT Filed: Mar. 18, 2020

(86) PCT No.: PCT/JP2020/012003
§ 371 (c)(1),
(2) Date: Jun. 10, 2022

(87) PCT Pub. No.: WO2020/203300
PCT Pub. Date: Oct. 8, 2020

(65) Prior Publication Data
US 2023/0162158 A1    May 25, 2023

(30) Foreign Application Priority Data
Apr. 5, 2019    (JP) .................................. 2019-072505

(51) Int. Cl.
*G06Q 10/10*    (2023.01)
*G06Q 10/06*    (2023.01)
(Continued)

(52) U.S. Cl.
CPC ......... *G06Q 10/1093* (2013.01); *G06Q 10/04* (2013.01)

(58) Field of Classification Search
CPC .............................. G06Q 10/10; G06Q 10/06
(Continued)

(56) References Cited

U.S. PATENT DOCUMENTS

2008/0065573 A1    3/2008 Macready
2017/0060623 A1*   3/2017 Syrichas .......... G06Q 10/06311
(Continued)

FOREIGN PATENT DOCUMENTS

WO    WO-2016/157333 A1    10/2016

OTHER PUBLICATIONS

Extended European Search Report issued in corresponding European Patent Application No. 20784414.3, dated Nov. 28, 2022; 9 pages.

(Continued)

*Primary Examiner* — Nga B Nguyen
(74) *Attorney, Agent, or Firm* — Foley & Lardner LLP

(57) ABSTRACT

A schedule creation assisting device 100 includes: a storage unit that stores information on a total working time length in a specified period of each of workers who work in cooperation in a specified operation, a number of the workers necessary at each timing during the period, and a constraint condition regarding allocation of the workers to the operation; and a computation unit 104 that computes an Ising model in which, regarding an objective function including, as terms, the total working time length in the period, the number of necessary workers, and a constraint condition function that is minimized when the constraint condition is satisfied, whether each of the workers is to attend at work is set as a spin, and a sensitivity between variables of the constraint condition function is set as an intensity of interaction between the spins, and that outputs a schedule in which whether each of the workers is to attend at work at the each timing during the specified period is specified based on the result.

16 Claims, 9 Drawing Sheets

(51) Int. Cl.
*G06Q 10/1093* (2023.01)
*G06Q 10/04* (2023.01)

(58) Field of Classification Search
USPC .......................................................... 705/7.18
See application file for complete search history.

(56) References Cited

U.S. PATENT DOCUMENTS

| 2017/0083841 A1* | 3/2017 | Syrichas | G06N 7/01 |
| 2017/0083873 A1* | 3/2017 | Syrichas | G06Q 10/1095 |
| 2017/0140325 A1* | 5/2017 | Syrichas | G06Q 10/063116 |

OTHER PUBLICATIONS

Yamaoka Masanao: "Overview of CMOS Annealing Machines", Jan. 31, 2019 (Jan. 31, 2019), pp. 1-4, XP093000189, Retrieved from the Internet: URL:https://www.ituaj.jp/wp-content/uploads/2019/01/nb31-1_web-08-Special-CMOSAnnealing.pdf [retrieved on Nov. 21, 2022]; 4 pages.

International Search Report with English translation and Written Opinion issued in corresponding application No. PCT/JP2020/012003 dated Jun. 9, 2020.

* cited by examiner

BASIC INFORMATION 125

| JANUARY | FEBRUARY | ... |

| DAY | TIME SLOT | OPERATOR 1 | OPERATOR 2 | OPERATOR 3 | ... | THE NUMBER OF NECESSARY OPERATORS |
|---|---|---|---|---|---|---|
| 1 | 9:00 - 9:10 | | | | ... | 10 |
| | 9:10 - 9:20 | | | | ... | 12 |
| | ... | ... | ... | ... | ... | ... |
| 2 | 9:00 - 9:10 | | | | ... | 11 |
| | 9:10 - 9:20 | | | | ... | 11 |
| | ... | ... | ... | ... | ... | ... |
| ... | ... | ... | ... | ... | ... | ... |
| 31 | 9:00 - 9:10 | | | | ... | 15 |
| | 9:10 - 9:20 | | | | ... | 18 |
| | ... | ... | ... | ... | ... | ... |
| THE NUMBER OF WORKING SHIFTS | — | 400±50 | 400±50 | 400±50 | ... | — |

FIG. 5

CONSTRAINT CONDITIONS 126

| # | DESCRIPTION OF CONSTRAINT CONDITION | IMPLEMENTATION EXAMPLE USING OPTIMIZATION SOLVER | | IMPLEMENTATION EXAMPLE USING ANNEALING MACHINE |
|---|---|---|---|---|
| 1 | 1 SHIFT SHALL BE ASSIGNED TO A WORKER ON A DAY | $\sum_{k=1}^{3} x_{i,j,k} = 1$ | × 31 × 30 PIECES (931 PIECES) | $\min \sum_{i=1}^{30} \sum_{j=1}^{31} \left[ \sum_{k=1}^{3} x_{i,j,k} - 1 \right]^2$ |
| 2 | THE NUMBER OF WORKERS ALLOCATED FOR EACH DAY SHALL BE EXACTLY THE SAME AS THE NUMBER OF NECESSARY WORKERS $N_j$ | $\sum_{i=1}^{30} x_{i,j} = N_j$ | × 31 PIECES | $\min \sum_{j=1}^{31} \left[ \sum_{i=1}^{30} x_{i,j} - N_j \right]^2$ |
| 3 | THE NUMBER OF WORKERS ALLOCATED FOR EACH DAY SHALL BE LARGER THAN OR EQUAL TO THE NUMBER OF NECESSARY WORKERS $N_j$ | $\sum_{i=1}^{30} x_{i,j} \geq N_j$ | × 31 PIECES | $\min \sum_{j=1}^{31} \left[ \sum_{i=1}^{30} x_{i,j} - y_j \right]^2$ <br> *$y_j$ IS AUXILIARY VARIABLE THAT EXPRESSES "LARGER THAN OR EQUAL TO $N_j$" (SEE DETAILS IN FOOTNOTE⁹) |
| 4 | UPPER LIMIT $U_i$ OF THE NUMBER OF WORKING DAYS OF EACH WORKER IN A SPECIFIED PERIOD (EXAMPLE: 31 DAYS) IS DETERMINED | $\sum_{j=1}^{31} x_{i,j} \leq U_i$ | × 30 PIECES | $\min \sum_{i=1}^{30} \left[ \sum_{j=1}^{31} x_{i,j} - y_i \right]^2$ <br> *$y_i$ IS AUXILIARY VARIABLE THAT EXPRESSES "SMALLER THAN OR EQUAL TO $U_i$" (SEE DETAILS IN FOOTNOTE) |
| 5-1 | THE NUMBER OF WORKING DAYS (EXAMPLE: 31 DAYS) FOR EACH WORKER FOR SPECIFIED PERIOD SHALL BE AS CLOSE TO SET $D_i$ AS POSSIBLE (IF NOT POSSIBLE, DIFFERENCE FROM SET TIME SHALL BE AS SMALL AS POSSIBLE) (FIRST ORDER) | $-\alpha_i^- \leq \sum_{j=1}^{31} x_{i,j} - D_i \leq \alpha_i^+$ <br> $\min \sum_{i=1}^{30} \alpha_i^- + \alpha_i^+$ | × 30 PIECES | × (5-2 CAN BASICALLY SUBSTITUTE FOR THIS) |
| 5-2 | THE NUMBER OF WORKING DAYS (EXAMPLE: 31 DAYS) FOR EACH WORKER FOR SPECIFIED PERIOD SHALL BE AS CLOSE TO SET $D_i$ AS POSSIBLE (IF NOT POSSIBLE, DIFFERENCE FROM SET TIME SHALL BE AS SMALL AS POSSIBLE) (SECOND ORDER) | △ (EXPRESSION ON RIGHT IS IMPLEMENTED AS IS) <br> * IT TAKES TIME OR CANNOT BE SOLVED | | $\min \sum_{i=1}^{30} \left[ \sum_{j=1}^{31} x_{i,j} - D_i \right]^2$ |
| 6-1 | LOWER LIMIT $L_i$ OF CONSECUTIVE WORKING DAYS IS SET | $\sum_{j} x_{i,j-1} - (L_i - 1)(x_{i,j-1} - x_{i,j}) \geq 0$ | × 30 × (31−$L_i$+1) PIECES | $\min - \sum_{i=1}^{30} \sum_{j=1}^{31-L_i+1} \prod_{k} x_{i,j+k}$ <br> * THE ORDER NEEDS TO BE LOWER THAN OR EQUAL TO SECOND ORDER (SEE DETAILS IN FOOTNOTE¹⁰) |
| 6-2 | UPPER LIMIT $U_i$ OF CONSECUTIVE WORKING DAYS IS SET | $\sum_{j} x_{i,j} \leq U_i$ | | $\min \sum_{i=1}^{30} \sum_{j=1}^{31-U_i} \prod_{k} x_{i,j+k}$ <br> * THE ORDER NEEDS TO BE LOWER THAN OR EQUAL TO SECOND ORDER (SEE DETAILS IN FOOTNOTE) |
| 6-3 | WORKING DAYS SHALL BE CONTINUOUS NOT DISCONTINUOUS (DEGREE CAN BE ADJUSTED) | △ (6-1 AND 6-2 ARE COMBINED AND EXPRESSED) | | $\min - \sum_{i=1}^{30} \sum_{j=2}^{31} x_{i,j-1} x_{i,j}$ |
| 6-4 | THE NUMBER OF CONSECUTIVE WORKING DAYS SHOULD BE SMALLER THAN OR EQUAL TO $D_i$ OR SO (HOLIDAY SHOULD BE SET AFTER $D_i$ + 1 DAYS FROM LAST HOLIDAY TO EXTENT POSSIBLE) | △ ("HOLIDAY MUST BE SET AFTER $D_i$ + 1 DAYS" IS POSSIBLE, AND THUS IT IS POSSIBLE IF CONDITION IS THAT "THE NUMBER OF TIMES WHEN THIS CONSTRAINT IS BROKEN SHALL BE MINIMIZED") | | $\min - \sum_{i=1}^{30} \sum_{j=D_i+1}^{31} (1 - x_{i,j})(1 - x_{i,j-D_i-1})$ |

FIG. 6

CONSTRAINT CONDITIONS 126

| # | Description | Constraint | Count | Objective (soft) |
|---|---|---|---|---|
| 7-1 | LOWER LIMIT $L_i$ OF THE NUMBER OF DAYS BETWEEN DISCONTINUOUS WORKING DAYS IS SET | $x_{i,j-1} - \sum_{t} x_{i,j-1+t} + x_{i,j} \le 1$ $\forall t \in \{2, 3, \ldots, L_i\}$ | × 30 × ? PIECES | $\min - \sum_{i=1}^{30} \sum_{j=1}^{31-L_i+1} \prod_{t=j}^{j+L_i-1}(1 - x_{i,t})$ * THE ORDER NEEDS TO BE LOWER THAN OR EQUAL TO SECOND ORDER (SEE DETAILS IN FOOTNOTE) |
| 7-2 | UPPER LIMIT $U_i$ OF THE NUMBER OF DAYS BETWEEN DISCONTINUOUS WORKING DAYS IS SET | $\sum_{t=1}^{U_i} x_{i,j-t} \ge 1$ | × 30 PIECES | $\min \sum_{i=1}^{30} \sum_{j=1}^{31-U_i+1} \prod_{t=j}^{j+U_i-1}(1 - x_{i,t})$ * THE ORDER NEEDS TO BE LOWER THAN OR EQUAL TO SECOND ORDER (SEE DETAILS IN FOOTNOTE) |
| 7-3 | HOLIDAYS SHALL BE CONTINUOUS NOT DISCONTINUOUS (DEGREE CAN BE ADJUSTED) | Δ (7-1 AND 7-2 ARE COMBINED AND EXPRESSED) | | $\min - \sum_{i=1}^{30} \sum_{j=1}^{31}(1 - x_{i,j-1})(1 - x_{i,j})$ |
| 7-4 | THE NUMBER OF CONSECUTIVE HOLIDAYS SHOULD BE SMALLER THAN OR EQUAL TO $D_i$ OR SO (WORKING DAY SHOULD BE SET AFTER $D_i + 1$ DAYS FROM LAST WORKING DAY TO EXTENT POSSIBLE) | Δ ("WORKING DAY MUST BE SET AFTER $D_i + 1$ DAYS" IS POSSIBLE, AND THUS IT IS POSSIBLE IF CONDITION IS THAT "THE NUMBER OF TIMES WHEN THIS CONSTRAINT IS BROKEN SHALL BE MINIMIZED") | | $\min - \sum_{i=1}^{30} \sum_{j=D_i+1}^{31} x_{i,j} x_{i,j-D_i-1}$ |
| 8 | PROHIBITED SHIFT PATTERN (SHIFT PATTERN OF $L$ CONSECUTIVE DAYS $p_0 \to p_1 \to \ldots \to p_L$) SHALL BE AVOIDED | $\sum_{l=0}^{L} x_{i,j+l,p_l} \le L$ | × 30 × (31 − $L_i$+1) PIECES | $\min \sum_{i=1}^{30} \sum_{j=1}^{31-L_i+1} \prod_{l=0}^{L} x_{i,j+l,p_l}$ * THE ORDER NEEDS TO BE LOWER THAN OR EQUAL TO SECOND ORDER (SEE DETAILS IN FOOTNOTE) |
| 9 | IF RECRUIT $i'$ ATTENDS AT WORK, ONE OR MORE WORKERS SHALL BE ALLOCATED FROM SET $T$ OF WORKERS WHO CAN GIVE INSTRUCTION TO THE RECRUIT | $x_{i',j} \le \sum_{i \in T} x_{i,j}$ | × THE NUMBER OF RECRUITS × 31 PIECES | $\min \sum_{i'} \sum_{j=1}^{31} x_{i',j} \prod_{i \in T}(1 - x_{i,j})$ * THE ORDER NEEDS TO BE LOWER THAN OR EQUAL TO SECOND ORDER (SEE DETAILS IN FOOTNOTE) |
| 10 | WORKER $i'$ AND WORKER $i''$ SHALL NOT ATTEND AT WORK ON SAME DAY | $x_{i',j} + x_{i'',j} \le 1$ | × 31 PIECES | $\min \sum_{j=1}^{31} x_{i',j} x_{i'',j}$ |
| 11 | SHIFT $k'$ ON SPECIFIED DAY $j'$ SHOULD BE ASSIGNED TO WORKER $i'$ "IF POSSIBLE" | ⟨EXPRESSION ON RIGHT IS ADDED TO OBJECTIVE FUNCTION⟩ | | $\min -x_{i',j',k'}$ |
| 12 | SPECIFIED WORKER $i'$ SHOULD BE ALLOCATED TO SHIFT $k'$ "TO EXTENT POSSIBLE" | ⟨EXPRESSION ON RIGHT IS ADDED TO OBJECTIVE FUNCTION⟩ | | $\min \sum_{j=1}^{31} -x_{i',j,k'}$ |
| 13 | THE NUMBER OF WORKING DAYS FOR EACH TYPE OF SHIFT SHALL BE EQUAL BETWEEN WORKERS (THE AVERAGE WORKING DAY FOR EACH TYPE OF SHIFT, CALCULATED FROM THE NUMBER OF NECESSARY WORKERS, SHALL BE $A_k$ WHICH IS GUIDELINE) | $-\delta_k \le \sum_{j=1}^{31} x_{i,j,k} - A_k \le \delta_k$ * $\delta$ IS ALLOWABLE ERROR FROM $A_k$ (ERROR CANNOT BE MINIMIZED) * TO MINIMIZE ERROR, $\delta_k$ NEEDS TO BE USED AS NEW VARIABLE AND ADDED TO FUNCTION TO BE MINIMIZED | × 30 PIECES × THE NUMBER OF SHIFT TYPES | $\min \sum_{i=1}^{30} \sum_{k} \left[ \sum_{j=1}^{31} x_{i,j,k} - A_k \right]^2$ |

FIG. 7

| JANUARY | | | | | | |
|---|---|---|---|---|---|---|
| DAY | TIME SLOT | OPERATOR 1 | OPERATOR 2 | OPERATOR 3 | ... | THE NUMBER OF NECESSARY OPERATORS |
| 1 | 9:00 – 9:10 | 1 | 0 | 1 | ... | 10 |
| | 9:10 – 9:20 | 1 | 0 | 0 | ... | 12 |
| | ... | ... | ... | ... | ... | ... |
| 2 | 9:00 – 9:10 | 1 | 0 | 0 | ... | 11 |
| | 9:10 – 9:20 | 1 | 0 | 0 | ... | 11 |
| | ... | ... | ... | ... | ... | ... |
| ... | ... | ... | ... | ... | ... | ... |
| 31 | 9:00 – 9:10 | 0 | 1 | 1 | ... | 15 |
| | 9:10 – 9:20 | 0 | 1 | 1 | ... | 18 |
| | ... | ... | ... | ... | ... | ... |
| THE NUMBER OF WORKING SHIFTS | — | 401 | 410 | 408 | ... | — |

FIG. 9

SCHEDULE CREATION ASSISTING DEVICE AND SCHEDULE CREATION ASSISTING METHOD

TECHNICAL FIELD

The present invention relates to a schedule creation assisting device and a schedule creation assisting method.

BACKGROUND ART

The concept of searching for a solution that maximizes or minimizes desired parameters under specified conditions, in other words, the concept of what is called a combinatorial optimization problem, can be applied to complex problems in the real world such as eliminating traffic congestion and reducing distribution costs in global supply chains.

However, in such problems, the number of solution candidates is tremendously large, making it difficult to solve the problem within a practical time unless the computer is one having a relatively high computing power, such as a supercomputer or a quantum computer.

For example, as a conventional technique related to quantum computers, a technique regarding a computer which enables a high-speed computation for an inverse problem or a combinatorial optimization problem requiring an exhaustive search has been proposed in which spins are used as variables in the computation, a problem intended to be solved is set using spin-spin interaction and a local field acting on each spin, all spins are caused to orient toward one direction by an external magnetic field at time t=0, the external magnetic field is gradually reduced such that the external magnetic field becomes zero at time t=τ, each spin is time-evolved on the assumption that the direction is determined to follow an effective magnetic field determined by all actions of spin-spin interaction and the external magnetic field of each site at time t, and in this process, the directions of the spins are not completely aligned to the effective magnetic fields but are caused to be quantum mechanically corrected directions so that the system can maintain an approximate ground state (see PTL 1).

CITATION LIST

Patent Literature

[PTL 1] WO2016/157333

SUMMARY OF INVENTION

Technical Problem

Unfortunately, there has not been proposed a configuration in which quantum computer techniques as described above are applied appropriately to the work of creating an overall schedule for a large number of workers who work in cooperation.

For example, the work of creating schedules of a call center requires creation of weekly or monthly shift schedules for hundreds of operators. In the current situation, an experienced person in charge creates schedules manually under predetermined rules (Example: Shift patterns such as early shifts and late shifts shall be combined and arranged in a fixed order and frequency for a specified period).

Such schedule creation can be made efficient to a certain extent by using functions in spreadsheet software on a common PC. However, in the case where the number of workers is larger than a certain level, or in the case where there are nonlinear constraint conditions a plurality of which affect one another, it is impossible to obtain a solution within a practical time. Hence, spreadsheet software can deal with only situations in a very small organization having only linear constraint conditions.

Creation of schedules for the case where a large number of workers work in corporation is greatly affected not only by basic factors such as rules for the number of working days for each worker and the number of necessary workers for each day but also various factors such as circumstances of each worker, workers' vague requests, the work system, and various kinds of rules. In addition, those factors themselves vary depending on the number of workers, the organization that the workers belong to, and demand for the operation, and the factors interfere and affect one another in some cases.

In addition, there are cases where a sudden change occurs in those factors, such as a sudden increase/decrease in the demand for the operation and abrupt absence of workers. In such situations, even if an attempt was made to create a schedule in a conventional way by using a common PC, the amount of calculation would increase exponentially according to the number of factors, nonlinear constraint conditions, and the like as described above, and the calculation would take an enormous amount of time or lead to an overflow. Simply put, the schedule probably cannot be created at a desired timing.

Hence, an object of the present invention is to provide a technique for efficiently creating a schedule with nonlinear constraint conditions taken into account for a large number of workers who work in corporation.

Solution to Problem

A schedule creation assisting device of the present invention to solve the above object comprising: a storage unit that stores information on a total working time length in a specified period of each of workers who work in cooperation in a specified operation, a number of the workers necessary at each timing during the period, and a constraint condition regarding allocation of the workers to the operation; and a computation unit that computes an Ising model in which, regarding an objective function including, as terms, the total working time length in the period, the number of necessary workers, and a constraint condition function that is minimized when the constraint condition is satisfied, whether each of the workers is to attend at work is set as a spin, and a sensitivity between variables of the constraint condition function is set as an intensity of interaction between the spins, wherein the computation unit outputs, to a specified device, a schedule in which whether each of the workers is to attend at work at the each timing during the specified period is specified based on a result of the computation.

A schedule creation assisting method of the present invention comprising: by an information processing device including a storage unit that stores information on a total working time length in a specified period of each of workers who work in cooperation in a specified operation, a number of the workers necessary at each timing during the period, and a constraint condition regarding allocation of the workers to the operation, computing an Ising model in which, regarding an objective function including, as terms, the total working time length in the period, the number of necessary workers, and a constraint condition function that is minimized when the constraint condition is satisfied, whether each of the workers is to attend at work is set as a spin, and a sensitivity between variables of the constraint condition function is set as an intensity of interaction between the spins; and outputting, to a specified device, a schedule in which whether each of the workers is to attend at work at the each timing during the specified period is specified based on a result of the computation.

Advantageous Effects of Invention

The present invention makes it possible to efficiently create a schedule with nonlinear constraint conditions taken into account for a large number of workers who work in cooperation.

BRIEF DESCRIPTION OF DRAWINGS

FIG. 5 is a diagram illustrating a configuration example of a basic information table in the present embodiment.

FIG. 6 is a diagram illustrating a configuration example of a constraint condition table in the present embodiment.

FIG. 7 is a diagram illustrating the configuration example of the constraint condition table in the present embodiment.

FIG. 9 is a diagram illustrating a screen example in the present embodiment.

DESCRIPTION OF EMBODIMENTS

Figure 1:
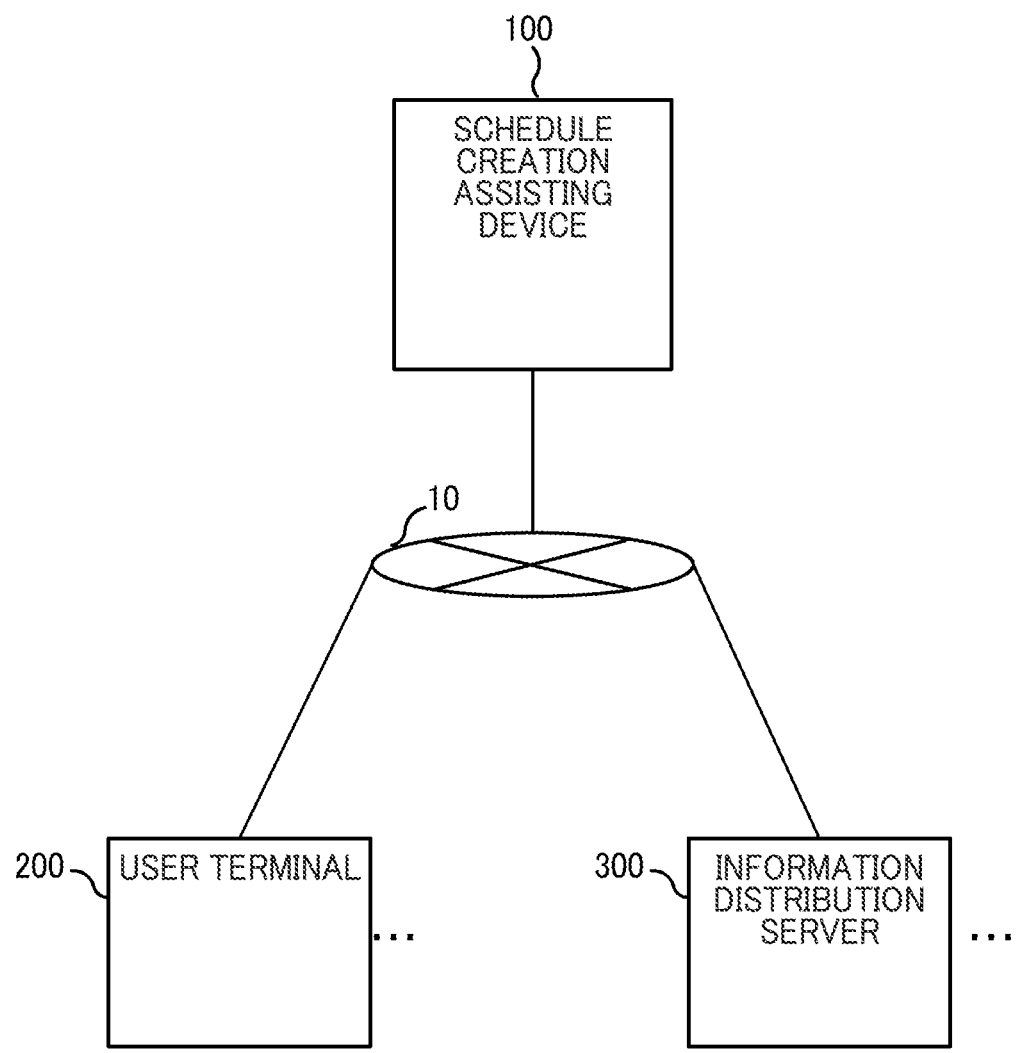
FIG. 1 is a network configuration diagram including a schedule creation assisting device of the present embodiment.

- - - Regarding Annealing Machine - - -

As described in the foregoing PTL 1, the applicant of the present application has developed quantum computing techniques and has been working to solve various problems, for example, in exhaustive search problems based on big data (including the concept of combinatorial optimization problems).

In general, expectation for quantum computers is high for such exhaustive search problems. A quantum computer uses basic elements called qubits which represent "0" and "1" simultaneously. Thus, the quantum computer is capable of calculating all the solution candidates simultaneously as initial values and has a possibility of achieving exhaustive search. However, the quantum computer needs to keep quantum coherence over the entire calculation time.

Under these circumstances, a method called adiabatic quantum computation has come to attract attention (Reference: E. Farhi, et al., "A quantum adiabatic evolution algorithm applied to random instances of an NP-complete problem," Science 292, 472 (2001)). In this method, a problem is converted such that the ground state of a physical system is the solution, and the solution is sought for through finding the ground state.

The Hamiltonian of the physical system to which a problem is set is defined as H^p. Here, at the start of computation, the Hamiltonian is not set to H^p, but to another Hamiltonian H^0 which is different from H^p and the ground state of which is clear and easy to prepare. Next, the Hamiltonian is transformed from H^0 to H^p taking a sufficient time. Taking a sufficient time makes the system keep staying in the ground state, providing the ground state of the Hamiltonian H^p. This is the principle of the adiabatic quantum computation. Defining τ as the calculation time, the Hamiltonian is expressed by Expression (1).

$$\hat{H}(t) = \left(1 - \frac{t}{\tau}\right)\hat{H}_0 + \frac{t}{\tau}\hat{H}_p \qquad \text{[Expression 1]}$$

The solution is obtained by time evolution based on a Schrodinger equation of Expression (2).

$$i\hbar \frac{\partial}{\partial t}|\psi(t)\rangle = \hat{H}(t)|\psi(t)\rangle \qquad \text{[Expression 2]}$$

Adiabatic quantum computation is applicable to a problem that requires exhaustive search, and it is possible to reach a solution in a one-way process. However, if the calculation process needs to conform to the Schrodinger equation of Expression (2), quantum coherence needs to be kept as in the case of a quantum computer.

While the quantum computer repeats gate operations on 1 qubit or between 2 qubits, adiabatic quantum computation causes interaction over the entire qubit system at the same time, and thus, the concept of coherence is different.

For example, consider a gate operation on a certain qubit. In this case, if there is an interaction between the qubit and other qubits, it will cause decoherence. But for adiabatic quantum computation, all the qubits are interacted simultaneously, and thus decoherence as in this example will not occur. In consideration of this difference, adiabatic quantum computation is thought to be more robust in terms of decoherence than the quantum computer.

As has been described above, adiabatic quantum computation is effective for a difficult question that requires exhaustive search. Then, spins are used as variable for computation, and a problem to be solved is set as interactions between spins and local fields acting on respective spins.

At time t=0, all the spins are made to be oriented in one direction using an external magnetic field, and the external magnetic field is gradually reduced such that it becomes zero at time t=τ.

Each spin is time-evolved on the assumption that the direction of each spin is determined according to the effective magnetic field determined by all the actions at time t which are the external magnetic field at each site and interactions between spins.

In this process, the direction of the spin is not made to be perfectly aligned with the effective magnetic field but to be oriented in a direction corrected quantum-mechanically, so that the system can almost keep the ground state.

In addition, a term to keep each spin at the original direction during time evolution (a relaxation term) is added to the effective magnetic field to improve the convergence of the solution.

The schedule creation assisting device in the present embodiment on the assumption here is an annealing machine that performs the foregoing adiabatic quantum computation, but, of course, is not limited to this. The present invention can be applied to any device capable of solving combinatorial optimization problems following the schedule creation assisting method of the present invention as appropriate.

Specifically, the applicable devices include not only hardware for implementing the annealing method using an electronic circuit (a digital circuit or the like) but also hardware using a superconducting circuit or the like. The embodiment is also applicable to hardware implementing an Ising model by a method other than the annealing method. For example, it includes a laser network method (optical parametric oscillation) and a quantum neural network, too. Although part of the concept is different as described above, the present invention can also be realized by using a quantum gate method in which calculation using an Ising model is replaced with gates such as Hadamard gates, rotation gates, and controlled NOT gates.

- - - Network Configuration - - -

Hereinafter, an embodiment of the present invention will be described in detail using drawings. FIG. 1 is a network configuration diagram including a schedule creation assisting device 100 of the present embodiment.

The schedule creation assisting device 100 illustrated in FIG. 1 is a computer device that efficiently creates schedules in which nonlinear constraint conditions regarding a large number of workers who work in cooperation are taken into account, and specifically, on the assumption here, it is an annealing machine as an example.

Since an overview of the annealing machine has been already described based on PTL 1, details of the specific configuration, operations, and the like of the annealing machine will be omitted as appropriate (the same applies in the following).

The schedule creation assisting device 100 of the present embodiment is coupled to a user terminal 200 such that data can be communicated between them via an appropriate network 10 such as the Internet.

The user terminal 200 receives a schedule proposal from the schedule creation assisting device 100.

The user of the user terminal 200 is specifically a business entity that has a large number of operators and performs call center operation with them, and on the assumption here, it is an organization such as a financial institution, an insurance company, or a major manufacturer. Examples of the user on the assumption also include a medical institution and a caregiving business entity that have a large number of nurses or caregiving staff members and carry out nursing work or caregiving work for patients or the like.

In any case, any business entity that allocates a necessary number, which is relatively large, of workers to days or time slots and carries out an operation as a whole can be the foregoing user. In other words, it can be said that the present invention can be applied to the operations of such business entities.

As a specific example that can be assumed, for example, in the case of creating a schedule for a call center of a bank, the reality is that a person in charge having specified experience manually inputs and creates monthly shift schedules for all the operators in a scale of several hundreds. In other words, such operation is manual work and tends to be dependent on individual skills.

For this reason, although it is possible to create schedules based on shifts according to fixed rules in a conventional way, it is difficult to create schedules for flexibly dealing with irregular shifts or external factors.

In addition, even if functions or the like in spreadsheet software are used, it is difficult to create schedules being free from realistic obstacles such as "holiday setting is limited only for Saturdays and Sundays" and "the number of workers that can be dealt with is up to 100".

The obstacles result from mathematical difficulties and the absence (immature in a strict sense) of techniques for solving the mathematical difficulties. Although spreadsheet software is capable of solving a problem at high speed if the constraint conditions are linear, it has a characteristic that it takes an enormous amount of time to solve a problem with nonlinear constraint conditions.

Thus, in the case of creating a schedule in a conventional technique as above, as the number of nonlinear constraint conditions regarding elements, in other words, workers or the like increases, the amount of calculation increases exponentially and thus requires a long time to complete calculation. However, employing the schedule creation assisting device 100 using an annealing machine makes it possible to perform calculation, not being much dependent on the increase in the number of elements.

- - - Hardware Configuration - - -

Figure 2:
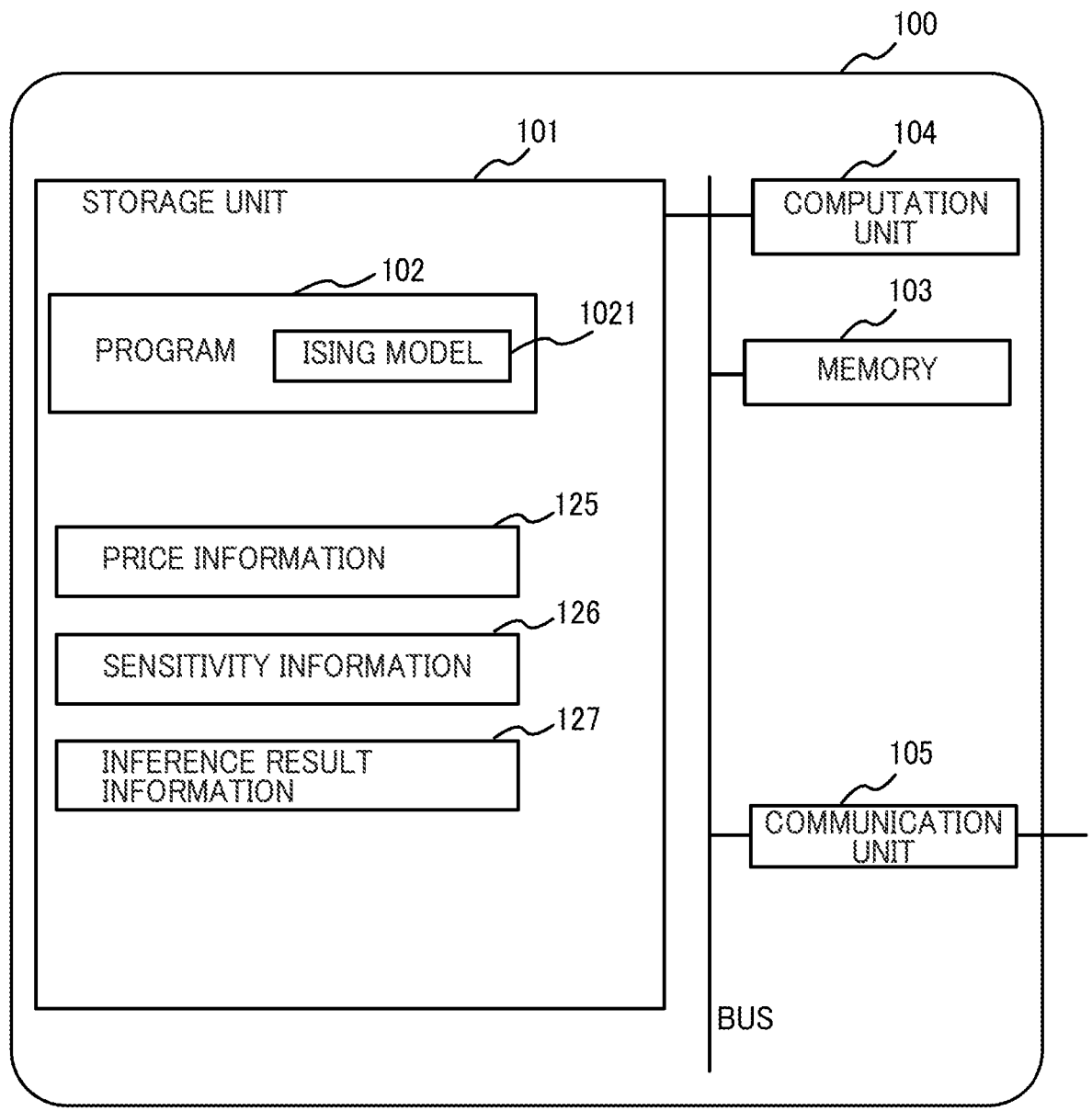
FIG. 2 is a diagram illustrating an example of a hardware configuration of the schedule creation assisting device in the present embodiment.

The hardware configuration of the schedule creation assisting device 100 of the present embodiment is as described in FIG. 2

Specifically, the schedule creation assisting device 100 includes a storage unit 101, a memory 103, a computation unit 104, and a communication unit 105.

Of these, the storage unit 101 includes an appropriate nonvolatile memory device such as a solid state drive (SSD) or a hard disk drive.

The memory 103 includes a volatile memory device such as RAM.

The computation unit 104 is a CPU that performs operation such as loading a program 102 stored in the storage unit 101 into the memory 103 and executing it to manage and control the device and that also performs various kinds of determination, computation, and control processing.

The communication unit 105 on the assumption here is a network interface card or the like that is coupled to the network 10 and performs processing for communication with the user terminal 200.

Note that in the case where the schedule creation assisting device 100 is a stand-alone machine, it is preferable that the schedule creation assisting device 100 further includes an input device for receiving key input and voice input from the user and an output device such as a display for displaying processing data.

The storage unit 101 stores, in addition to the program 102 for implementing the functions necessary for the schedule creation assisting device of the present embodiment, at least a basic information table 125 and a constraint condition table 126. Details of these tables will be described later.

The program 102, in other words, the algorithm for implementing the operation as an annealing machine, holds information on an Ising model 1021 which is a problem to be solved. This Ising model 1021 is set in advance by the administrator or the like based on various kinds of information on the operation and workers the information on which needs to be provided and other information that affects those factors.

Note that the adiabatic quantum computation described in an overview of the annealing machine is also called another name, quantum annealing, in which the concept of classical annealing is extended into quantum mechanics. Specifically, it can be interpreted that adiabatic quantum computation can originally perform classical operation, and that quantum-mechanical effects were added to the adiabatic quantum computation to improve performance on high speed and the correct answer rate of a solution. In this respect, in the present invention, the computation unit itself is classical but parameters determined quantum-mechanically are introduced in the computation process to achieve a computation method and device that are classical but include quantum-mechanical effects. Here, of course, a configuration having a quantum computer as the computation unit may be employed.

Based on the above concept, the following example illustrates a classical algorithm to obtain the ground state as the solution and a device to achieve it while describing relationship with adiabatic quantum computation.

In the schedule creation assisting device 100 on the above premise, N variables $sj^z$ (j=1, 2, . . . , N) take a value range of $-1 \leq sj^z \leq 1$, and a problem is set using the local fields gj and inter-variable interactions Jij (i, j=1, 2, . . . , N).

The computation unit 104, dividing the time by m, performs computation discretely from $t=t_0$ ($t_0$=0) to tm (tm=τ). To calculate the variable $Sj^z(tk)$ at each time tk, the value of the variable of $Sj^z(tk-1)$ (i=1, 2, . . . , N) at the previous time tk−1 and the coefficient of the relaxation term, 9pina or 9pinb, are used to calculate $Bj^z(tk)=\{\Sigma iJijSi^z(tk-1)+gj+sgn(sj^z(tk-1))\cdot 9pina\}\cdot tk/\tau$ or $Bj^z(tk)=\{\Sigma iJiJSj^z(tk-1)+gj+9pinb\cdot Sj^z(tk-1)\}\cdot tk/\tau$. The function f is determined such that the value range of the foregoing variable $Sj^z(tk)$ is $-1 \leq sj^z(tk) \leq 1$, and $Sj^z(tk)=f(Bj^z(tk),tk)$ is obtained. As the time step is advanced from t=t0 to t=tm, the foregoing variable $Sj^z$ is made closer to −1 or 1. In the end, if $sj^z$<0, $Sj^{zd}$ is set as $Sj^{zd}$=−1, and if $Sj^z$>0, as $Sj^{zd}$=1, and the solution is determined.

The coefficient gpinb is, for example, a value between 50% and 200% of the average value of |Jij|. As for the local field gj for the problem setting, the correction term δgj' may be added to gj' only for a certain site j' to increase the magnitude of gj' only for the site j'. The correction term δgj' is, for example, a value between 10% and 100% of the average value of |Jij|.

Next, the basic principle of the annealing machine will be described by starting from a quantum-mechanical description and moving to a classical form.

The Ising spin Hamiltonian ground-state search problem given by Expression (3) includes a problem in a classification called NP-hardness and is known to be a useful problem (Reference: F. Barahona, "On the computational complexity of Isingspin glass models," J. Phys. A: Math. Gen. 15, 3241 (1982)).

$$\hat{H}_p = -\sum_{i>j} J_{ij}\hat{\sigma}_i^z\hat{\sigma}_j^z - \sum_j g_j \hat{\sigma}_j^z \qquad \text{[Expression 3]}$$

Jij and gj are problem setting parameters, and $\sigma^{\wedge z}$ is the z component of the Pauli spin matrix and takes an eigenvalue of ±1. The symbols i, j indicate the site of a spin. Ising spins are variables that can only take values of ±1. Since the eigenvalue of $\sigma^{\wedge z}$ is ±1 in Expression (3), it expresses an Ising spin system.

The Ising spins of Expression (3) do not have to be literal spins, but they may be physically anything as long as the Hamiltonian is described by Expression (3).

For example, whether each worker is to attend at work can be associated with ±1, the high and low of a logic circuit can be associated with ±1, the vertical polarization waves and horizontal polarization waves of light can be associated with ±1, or the phases of 0 and τ can be associated with ±1.

In the method shown here as an example, as in adiabatic quantum computation, a system for computation is prepared in the ground state of the Hamiltonian given by Expression (4) at time t=0.

$$\hat{H}_0 = -\gamma \sum_j \hat{\sigma}_j^x \qquad \text{[Expression 4]}$$

Here, γ is a constant of proportionality determined by the magnitude of the external field that are uniformly applied to all the sites j, and $\sigma^{\wedge}j^x$ is the x component of the Pauli spin matrix. If the system for computation is literal spins, the external field means a magnetic field.

Expression (4) means that a transverse magnetic field is applied, and the case where all the spins are oriented in the x direction (γ>0) is the ground state. The Hamiltonian for problem setting is defined as an Ising spin system having only z components, but Expression (4) includes the x components of the spins. Hence, the spins during the computation process are not Ising but are vectors (Bloch vectors). At t=0, the system starts as the Hamiltonian in Expression (4). As time t progresses, the Hamiltonian is gradually changed. In the end, the system is changed to the Hamiltonian expressed by Expression (3) to obtain its ground state as the solution.

$$\hat{H} = -B \cdot \hat{\sigma} \qquad \text{[Expression 5]}$$

Here, $\sigma^{\wedge}$ expresses the three components of the Pauli spin matrix as a vector. The ground state is a state in which the spin is oriented in the magnetic field direction, and $\langle\sigma^{\wedge}\rangle$ can be expressed as $\langle\sigma^{\wedge}\rangle = B/|B|$, where $\langle \cdot \rangle$ means the quantum-mechanical expectation value. Since in the adiabatic process, the system always seeks to keep the ground state, the direction of the spin always follows the direction of the magnetic field.

The above discussion can be extended to a multi-spin system. At t=0, the Hamiltonian is given by Expression (4). This means that the magnetic field $Bj^x=\gamma$ is uniformly applied to all the spins. When t>0, the x component of the magnetic field is gradually reduced, which is expressed as $Bj^x=\gamma(1-t/\tau)$. Since the z components are affected by spin-spin interactions, the effective magnetic field is expressed by Expression (6).

$$\hat{B}_j^z(t) = \frac{t}{\tau}\left(\sum_{i \neq j} J_{ij}\hat{\sigma}_i^z + g_j\right) \qquad \text{[Expression 6]}$$

Since the direction of the spin can be defined by $\langle\sigma^{\wedge z}\rangle/\langle\sigma^{\wedge x}\rangle$, if the direction of the spin follows the effective magnetic field, the direction of the spin is determined by Expression (7).

$$\langle\hat{\sigma}_j^z\rangle/\langle\hat{\sigma}_j^x\rangle = \langle\hat{B}_j^z(t)\rangle/\langle\hat{B}_j^x(t)\rangle \qquad \text{[Expression 7]}$$

Expression (7) is a quantum-mechanical description, but since it is expressed by expectation values, Expression (7) is a relational expression based on classical quantities. This point is different from Expressions (1) to (6).

Since a classical system does not have nonlocal correlation (quantum entanglement) that quantum mechanics has, the direction of the spin is perfectly determined by the local field at each site, and Expression (7) determines the behavior of the classical spin system. Since a quantum system has nonlocal correlation, Expression (7) is modified, which will be described later. Here, the classical system determined by Expression (7) will be described to mention the basic form of the invention.

Figure 3:
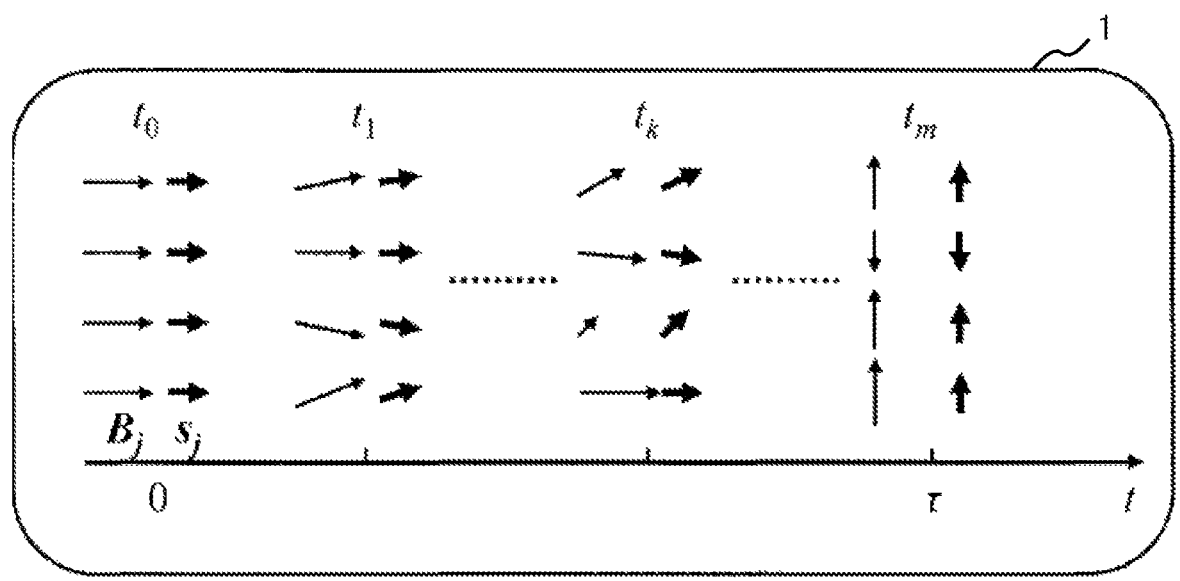
FIG. 3 is a diagram illustrating a timing chart example in the present embodiment.

FIG. 3 illustrates a timing chart (1) to obtain the ground state of a spin system. Since the illustration in FIG. 3 is based on classical quantities, the spin at site j is expressed by sj not by σ^j. With this, the effective magnetic field Bj in FIG. 3 is a classical quantity. At t=0, the effective magnetic field Bj in the right direction is applied at all the sites, and all the spins Sj are initialized so that that the spins Sj are directed to the right.

As time t passes, a magnetic field in the z axis direction and spin-spin interactions are gradually applied to the spins. In the end, the spins are oriented in the +z direction or the −z direction, and the z component of the spin Sj becomes $sj^z$=+1 or −1. Ideally, time t is continuous, but in the actual computation process, time can be discrete to improve the convenience. The following description is based on a case where time t is discrete.

Since the spins illustrated as an example here have not only z components but also x components, they are vector spins. Behavior as vectors can be understood also from FIG. 3. Y components have not appeared so far in the discussion. The reason is that since the direction of the external field is defined in the xz plane, the external field does not have a y component, and thus $<σ^Y>$=0.

In the assumption here, each spin in the system for computation is a three-dimensional vector having a size of 1 (this is called a Bloch vector, the state of which can be described with a point on a spherical surface). However, in the case of the axes in the example in the figure, only two dimensions need to be considered (the state can be described with a point on a circle).

Here, since γ is constant, $Bj^x(t)>0$ (γ>0) or $Bj^x(t)<0$ (γ<0) holds. In this case, a two-dimensional spin vector can be described only with a semicircle. Hence, by specifying $Sj^z$ with [−1, 1], one variable $Sj^z$ determines a two-dimensional spin vector. Thus, in the example here, although a spin is a two-dimensional vector, it also can be expressed as one-dimensional continuous variable having a value range of [−1, 1].

In the timing chart of FIG. 3, the effective magnetic field is calculated for each site at time t=tk, and using the calculated value, the direction of the spin at t=tk is calculated with Expression (8).

$$S_j^z(t_k)/S_j^x(t_k)=B_j^z(t_k)/B_j^x(t_k) \quad \text{[Expression 8]}$$

Since Expression (8) is what Expression (7) was rewritten into so that the expression is based on classical quantities, it does not have the mark $<·>$. Next, the effective magnetic field at t=tk+1 is calculated by using the value of the spin at t=tk. The effective magnetic field at each time specifically written is Expressions (9) and (10).

$$B_j^x(t_{k+1}) = \left(1 - \frac{t_{k+1}}{\tau}\right)\gamma \quad \text{[Expression 9]}$$

$$B_j^z(t_{k+1}) = \frac{t_{k+1}}{\tau}\left(\sum_{i \neq j} J_{ij}s_i^z(t_k) + g_j\right) \quad \text{[Expression 10]}$$

In the following, the spin and the effective magnetic field are calculated alternately according to the procedure schematically illustrated with the timing chart of FIG. 3.

In a classical system, the size of the spin vector is 1. In this case, each component of the spin vector is expressed as $Sj^z(tk)$=sin θ and $Sj^x(tk)$=cos θ, by using the parameter θ defined by tan θ=$Bj^z(tk)/Bj^x(tk)$.

These can be rewritten as $Sj^z(tk)$=sin(arctan($Bj^z(tk)/Bj^x(tk)$)) and $Sj^x(tk)$=cos(arctan($Bj^z(tk)/Bj^x(tk)$)).

As is clear from Expression (9), the variable of $Bj^x(tk)$ is only tk, and τ and γ are constants. Thus, $Sj^z(tk)$=sin(arctan($Bj^z(tk)/Bj^x(tk)$)) and $Sj^x(tk)$=cos(arctan($Bj^z(tk)/Bj^x(tk)$)) can be expressed in generalized forms as $Sj^z(tk)$=f1($Bj^z(tk)$, tk) and $Sj^x(tk)$=f2($Bj^z(tk)$,tk), which are functions having $Bj^z(tk)$ and tk as variables.

Since the spin is described as a two-dimensional vector, the two components $Sj^z(tk)$ and $sj^x(tk)$ appear. However, if $Bj^z(tk)$ is determined based on Expression (10), $Sj^x(tK)$ is not necessary.

This corresponds to that the state of the spin can be described only by $Sj^z(tk)$ having a value range of [−1, 1]. Since the final solution $Sj^{zd}$ needs to be $Sj^{zd}$=−1 or 1, if $Sj^z(τ)>0$, it is determined that $Sj^{zd}$=1, and if $Sj^z(τ)<0$, it is determined that $Sj^{zd}$=−1.

Figure 4:
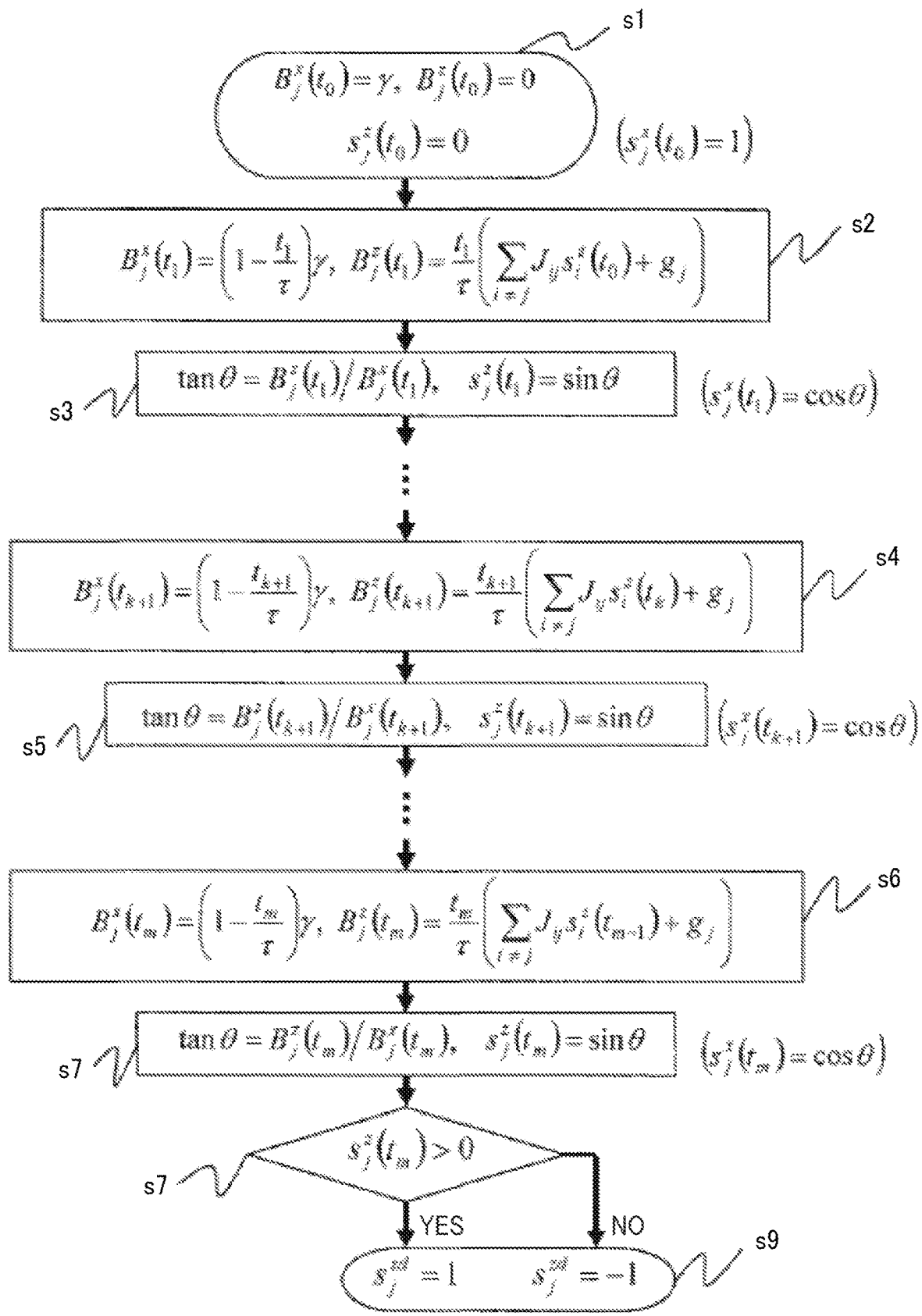
FIG. 4 is a diagram illustrating a procedure example 1 in the present embodiment.

FIG. 4 illustrates a flowchart in which the algorithm described above is organized. Here, tm=τ. Each of the steps s1 to s9 in the flowchart of FIG. 4 corresponds to the process at a time in the timing chart of FIG. 3 from time t=0 to t=τ. Specifically, the steps s2, s4, and s6 in the flowchart correspond to the above Expressions (9) and (10) at t=t1, tk+1, and tm, respectively. The final solution is obtained by determining at step s8 that $Sj^{zd}$=−1 if $sj^z<0$ or that $Sj^{zd}$=1 if $Sj^z>0$ (s9).

The description up to this point has shown how the problem expressed by Expression (3) is solved. Next, a description is given of how a specific problem is expressed by Expression (3) including the local field gj and the inter-variable interaction Jij (i, j=1, 2, . . . , N), by showing a specific example.

A specific problem, in other words, an Ising model 1021 on the assumption here is an Ising model in which, for example, based on information on the total number of working days of each of the operators working for a call center operation in a specified month, the number of operators necessary for each day in the month, and constraint conditions regarding allocation of each operator to the call center operation, an objective function is set that includes, as terms, the total number of working days for the month, the number of operators necessary for each day in the month, and the constraint condition functions that are minimized when the above constraint conditions are satisfied, and regarding the objective function, whether each operator is to attend at work is defined as a spin, and the sensitivity between the variables of the constraint condition function is defined as the intensity of interaction between the spins.

In this case, the local field gj on the assumption here is set as the degree of influence on the objective function given by the values of the variables representing the total number of working days for the month, the number of operators necessary for each day in the month, and the constraint condition functions that are minimized when the constraint conditions are satisfied, as described above.

Through the discussion described above, the inter-variable interaction Jij (related to between the items of the above objective function) and the local field gj are specifically set. Searching for the ground state of the Ising model 1021 expressed by Expression (3) is performed, in other words, searching for the ground state that minimizes the objective function including the total number of working days for the month, the number of operators necessary for each day in the month, and the constraint condition functions that are minimized when the constraint conditions are satisfied is performed. Through the searching, the work shifts for each operator, in other words, the overall schedule for the month for the call center operation is determined.

Note that the calculation using an Ising model and the annealing method is used only for "minimizing the objective function". Hence, if there are constraint conditions that need to be satisfied when the objective function is minimized, those conditions need to be added to the objective function in some way.

For example, think about a constraint condition expressed by Expression (11).

$$\sum_i x_i = A \quad \text{[Expression 11]}$$

This constraint condition can be converted into "a function that is minimized when the constraint condition is satisfied", which is the following expression.

$$\left[\sum_i x_i - A\right]^2 \quad \text{[Expression 12]}$$

Since the square portion always has a positive value, this expression takes the minimum value only when the inside of the square is 0. Since the inside is 0 only when $\Sigma X_i - A = 0$, by finding a solution of the optimization problem that minimizes this function, the solution with which $\Sigma X_i = A$ is satisfied is automatically obtained.

For example, since in the foregoing annealing method, the items desired to be constraint conditions also need to be included in the objective function, the objective function and the constraint conditions are treated to the degree of the same importance.

For example, assume an optimization problem as below.

$$\min: \sum_k a_k x_k \quad \text{[Expression 13]}$$
$$\text{subject to: } \sum_k b_k x_k = B$$
$$\sum_k c_k x_k = C$$

These can be changed into formularization for annealing as follows.

$$\min: \sum_k a_k x_k + P\left[\sum_k b_k x_k - B\right]^2 + Q\left[\sum_k c_k x_k - C\right]^2 \quad \text{[Expression 14]}$$

Here, P and Q are constants, which are factors that determine which item is preferentially minimized. For example, in the case of uniformly minimizing the three items (in other words, solving the problem without biasing the intensities of the constraint conditions), P and Q are set to be the same or similar values. In this way, the values are set to balance between the items.

However, if the problem setting is based on that "the constraint condition of the second item is strictly kept, but a great importance is not attached to the constraint condition of the third item", the value of P which is the coefficient of the item of a great importance is set larger than the value of Q to obtain a desired solution.

As described above, the annealing method makes it possible to assign priority for the constraint conditions and make setting, for example, for a constraint condition of less importance like "it should be satisfied as much as possible".

Note that various settings regarding the Ising model are made as appropriate according to each condition and information for creating a schedule in the present embodiment based on existing general concepts.

- - - Specific Examples of Spin (Variable) Setting - - -

<Spins in Time Table>

Consider a variable x_(i, j, k) that is 1 when a worker i carries out a work type k in a time slot j and that is 0 when the worker i does not (see FIG. 5). Basically, each one of the variables x_(i, j, k) is assigned to a spin one by one in the CMOS annealing machine.

In the case of not taking the "work type" into account, this variable simply gives "whether a worker i is to work in a time slot j". Specifically, in the following Table 1, the cells having 1 mean carrying out the work, and the cells having 0 mean not carrying out the work.

TABLE 1

| Time Slot | Worker 1 (i = 1) | Worker 2 (i = 2) | Worker 3 (i = 3) | ... | Worker 30 (i = 30) | The Number of Necessary Operators |
|---|---|---|---|---|---|---|
| 9:00 to 9:10 (j = 1) | $x_{1,1,k}$ | $x_{2,1,k}$ | $x_{3,1,k}$ | ... | $x_{30,1,k}$ | 10 |
| 9:10 to 9:20 (j = 2) | $x_{1,2,k}$ | $x_{2,2,k}$ | $x_{3,2,k}$ | ... | $x_{30,2,k}$ | 12 |
| 9:20 to 9:30 (j = 3) | $x_{1,3,k}$ | $x_{2,3,k}$ | $x_{3,3,k}$ | ... | $x_{30,3,k}$ | 10 |
| 9:30 to 9:40 (j = 4) | $x_{1,4,k}$ | $x_{2,4,k}$ | $x_{3,4,k}$ | ... | $x_{30,4,k}$ | 10 |
| ... | ... | ... | ... | ... | ... | ... |
| 20:50 to 21:00 (j = 72) | $x_{1,72,k}$ | $x_{2,72,k}$ | $x_{3,72,k}$ | ... | $x_{30,72,k}$ | 3 |
| The Number of Working Shifts | 400 ± 50 | 400 ± 50 | 400 ± 50 | ... | 400 ± 50 | |

TABLE 2

| Value of $x_{1,1,1}$ | Value of $x_{1,1,2}$ | work type |
|---|---|---|
| 0 | 0 | Rest |
| 1 | 0 | Inbound Operation |
| 0 | 1 | Outbound Operation |
| 1 | 1 | (not applicable) *That two variables are both 1 is prohibited by constraint condition |

In the case of taking the "work type" into account, in the above Table 2, the work type "inbound" is associated with k=1, and the work type "outbound" is associated with k=2. Thus, one cell on the timetable is expressed by the combination of the two variables. Specifically, if two variables (x_(i, j, 1) and x_(i, j, 2)) belonging to a cell are both 0, the cell means "rest", if x_(i, j, 1) is 1, and x_(i, j, 2) is 0, the cell means "inbound", and if x_(i, j, 1) is 0, and x_(i, j, 2) is 1, the cell means "outbound". Here, since the case where x_(i, j, 1) and x_(i, j, 2) are both 1 means that "one person carries out two different kinds of work in one and the same time slot", this case needs to be excluded as a constraint condition.

<Spins in Shifts for Month>

Here, consider a variable x_(i, j, k) that is 1 when a worker i carries out a work type k on a day j and that is 0 when the worker i does not. Here, L_i is the lower limit of the number of working days for the worker i, U_i is the upper limit, and N_j is the number of workers necessary for the day j. Basically, each one of the variables x_(i, j, k) is assigned to a spin one by one in the CMOS annealing machine (see Table 3).

TABLE 3

| Day | Worker 1 (i = 1) | Worker 2 (i = 2) | Worker 3 (i = 3) | ... | Worker 30 (i = 30) | The Number of Necessary Operators |
|---|---|---|---|---|---|---|
| 1st (j = 1) | $x_{1,1,k}$ | $x_{2,1,k}$ | $x_{3,1,k}$ | ... | $x_{30,1,k}$ | $N_1$ |
| 2nd (j = 2) | $x_{1,2,k}$ | $x_{2,2,k}$ | $x_{3,2,k}$ | ... | $x_{30,2,k}$ | $N_2$ |
| 3rd (j = 3) | $x_{1,3,k}$ | $x_{2,3,k}$ | $x_{3,3,k}$ | ... | $x_{30,3,k}$ | $N_3$ |
| 4th (j = 4) | $x_{1,4,k}$ | $x_{2,4,k}$ | $x_{3,4,k}$ | ... | $x_{30,4,k}$ | $N_4$ |
| ... | ... | ... | ... | ... | ... | ... |
| 31st (j = 31) | $x_{1,31,k}$ | $x_{2,31,k}$ | $x_{3,31,k}$ | ... | $x_{30,31,k}$ | $N_{31}$ |
| The Number of Working Shifts | $L_1$ to $U_1$ | $L_2$ to $U_2$ | $L_3$ to $U_3$ | ... | $L_{30}$ to $U_{30}$ | |

In the case of not taking the "work type" into account, this variable simply gives "whether a worker i is to work on a day j". Specifically, in Table 3, the cells having 1 mean attendance at work, and the cells having 0 mean holidays.

In the case of taking the "work type" into account, for example, it is conceivable that the "early shift" is associated with k=1, the "late shift" with k=2, and the "midnight shift" with k=3. In this case, there are three variables that correspond to the top leftmost cell of the table in FIG. 7, (x_1, 1, 1, x_1, 1, 2, and x_1, 1, 3). Since each of the three variables takes a value of 0 or 1, there are eight possible combinations as shown in the following Table 4.

TABLE 4

| Value of $x_{1,1,1}$ | Value of $x_{1,1,2}$ | Value of $x_{1,1,3}$ | work type |
|---|---|---|---|
| 0 | 0 | 0 | holiday |
| 1 | 0 | 0 | early shift |
| 0 | 1 | 0 | late shift |
| 0 | 0 | 1 | midnight shift |
| 1 | 1 | 0 | x(prohibit by constraint condition) |
| 1 | 0 | 1 | x(prohibit by constraint condition) |
| 0 | 1 | 1 | x(prohibit by constraint condition) |
| 1 | 1 | 1 | x(prohibit by constraint condition) |

In this case, a constraint condition that "of the three variables (x_1, 1, 1, x_1, 1, 2, and x_1, 1, 3), only one variable can take 1" needs to be added to prohibit the results in the bottom four lines in the above table.

- - - Example of Data Structure - - -

Next, a description will be given of various kinds of information used by the schedule creation assisting device 100 of the present embodiment. FIG. 5 illustrates an example of a basic information table 125 in the present embodiment.

The basic information table 125 of the present embodiment stores information on the total number of working shifts for specified months for each of the operators that work in corporation in a call center operation and the number of operators necessary for each time slot on each day in the month.

This example is a combinatorial optimization problem in which the length of the time slot is 10 minutes, the number of necessary operators specified across each horizontal line needs to be satisfied in each time slot, and the number of working hours (the number of working shifts) for each operator needs to be kept. In this problem, the shorter the length of the divided time slot, the larger the number of cells necessary for calculation (the cells in this table=factors), and the higher the necessary calculation power. Since the number of cells is large, if constraints are applied, such as prohibited patterns, the minimum number of consecutive shifts (the guideline for the minimum number of consecutive working shifts), the maximum number of consecutive shifts (the guideline for the maximum number of consecutive working shifts), and the like, the number of constraint condition functions according to the constraint conditions is enormous. However, employing the CMOS annealing method makes it possible to determine preferred results, in other words, a preferred schedule within a realistic time.

Note that the example shown in the basic information table 125 of FIG. 5 only has limited information for convenience of explanation, and thus it is assumed that the table stores information on other various events (the same applies in the following).

FIGS. 6 and 7 illustrate an example of a constraint condition table 126 in the present embodiment. The constraint condition table 126 of the present embodiment stores information on the constraint conditions regarding allocation of each operator to the foregoing call center operation.

The data structure of the table is a set of records including data such as the identification information ("#" in the figure) of each constraint condition, which is used as a key, the description of the constraint condition, an implementation example with an optimization solver, and an implementation example with an annealing machine (a constraint condition function).

The present embodiment not only shows implementation examples with an annealing machine, in other words, constraint condition functions, but to compare them with a conventional technique, the present embodiment also shows, side by side, examples of functions in which the constraint condition is implemented with an optimization solver.

- - - Example of Procedure - - -

Hereinafter, a description will be given of an actual procedure of the schedule creation assisting method in the present embodiment based on the figures. Various operations corresponding to the schedule creation assisting method described below are implemented by using a program that the schedule creation assisting device 100 loads into a memory or the like and executes. This program includes code for performing various operations described below.

Figure 8:
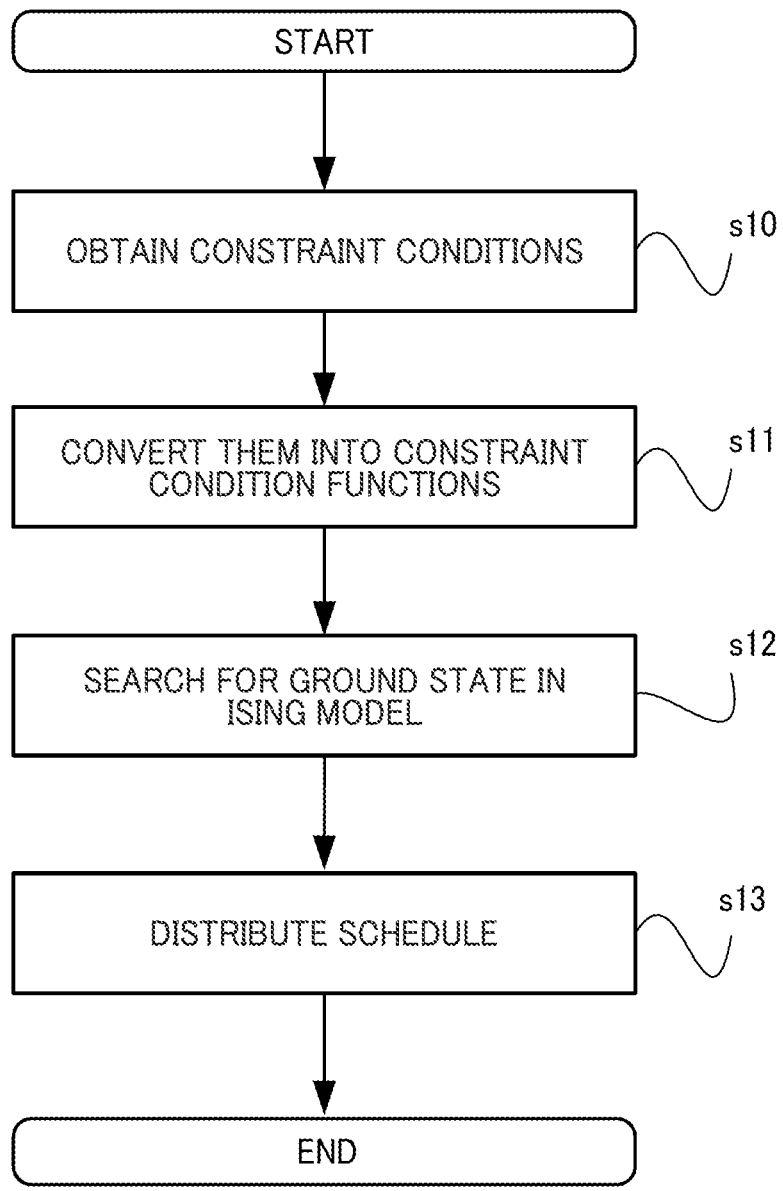
FIG. 8 is a flowchart showing a schedule creation assisting method in the present embodiment.

FIG. 8 is a diagram illustrating an example of a procedure for the schedule creation assisting method in the present embodiment. In this case, the schedule creation assisting device 100 computes an Ising model 1021 which is set as a processing target in which regarding an objective function including, as terms, the total number of working shifts of each operator for a certain month, the number of necessary operators, and the constraint condition functions, whether each operator is to attend at work is defined as a spin, and the sensitivity between variables of the constraint condition function is set as the intensity of interaction between the spins.

The schedule creation assisting device 100 obtains conditions desired by each operator from the user terminal 200 and stores them in the constraint condition table 126 as constraint conditions (s10). Alternatively, in this process, each operator may specify the constraint conditions that match desired constraint conditions out of the constraint condition table 126, and the schedule creation assisting device 100 may receive the specification from each operator.

The schedule creation assisting device 100 converts the constraint conditions obtained at s10 into constraint condition functions as already described (s11). These constraint condition functions are functions that are minimized when the constraint conditions are satisfied. Note that in the case of receiving the specification of constraint conditions at s10 as described above, the schedule creation assisting device 100 extracts constraint condition functions already defined for the constraint conditions from the constraint condition table 126.

As an annealing machine, the schedule creation assisting device 100 sets, as a problem, an Ising model 1021 in which the foregoing three items (the total number of working shifts, the number of necessary operators, and the constraint condition functions) are set and calculates and determines the ground state that minimizes the objective function (s12). Searching for the ground state in itself is the same as or similar to the process in conventional techniques.

Specifically, the constraint conditions regarding each operator and the rules on the basic information such as the total number of working shifts and the number of necessary operators are satisfied, transition toward the final state indicating whether each time slot is assigned (in theory based on sensitivities) progresses as time passes, and a state in which the results of assignment for each operator are settled is searched for as the ground state.

The schedule creation assisting device 100 transmits information indicating whether each time slot is assigned to each operator determined at s12 (the screen 900 of FIG. 9) to the user terminal 200 as a schedule (s13) and ends the process.

The user terminal 200, receiving provision of such information, displays a schedule screen 900 as illustrated in FIG. 9 on an output device such as a display.

The operator of the user terminal 200 views the schedule screen 900, recognizes the timetable, for example, for the next month, tomorrow, or one hour ahead, and checks and examines the call center operation appropriately.

Note that examples of schedule created according to the types of constraint conditions are shown as follows. Here, the result (Table 5) of creating a schedule on the premise that there is no such constraint condition regarding continuous work (Expression 15: Working shifts shall be continuous to the extent possible) and a schedule (Table 6) for the case where the constraint condition is solved are both shown for comparison.

[Expression 15]

$$\min - \sum_{i=1}^{4} \sum_{j=2}^{15} x_{i,j-1} x_{i,j} \quad \text{Expression 15}$$

TABLE 5

In the case where there are no constraint conditions

| Time Slot | Operator 1 | Operator 2 | Operator 3 | Operator 4 | The Number of Necessary Operators |
|---|---|---|---|---|---|
| 9:00 to 9:10 | work | rest | rest | work | 2 |
| 9:10 to 9:20 | rest | work | rest | work | 2 |
| 9:20 to 9:30 | work | rest | work | rest | 2 |
| 9:30 to 9:40 | rest | work | rest | work | 2 |
| 9:40 to 9:50 | work | rest | work | rest | 2 |
| 9:50 to 10:00 | rest | work | work | work | 3 |
| 10:00 to 10:10 | work | work | work | work | 4 |
| 10:10 to 10:20 | work | work | work | work | 4 |
| 10:20 to 10:30 | work | work | work | rest | 3 |
| 10:30 to 10:40 | work | rest | work | work | 3 |

TABLE 5-continued

In the case where there are no constraint conditions

| Time Slot | Operator 1 | Operator 2 | Operator 3 | Operator 4 | The Number of Necessary Operators |
|---|---|---|---|---|---|
| 10:40 to 10:50 | rest | work | work | rest | 2 |
| 10:50 to 11:00 | work | rest | rest | work | 2 |
| 11:00 to 11:10 | rest | work | work | rest | 2 |
| 11:10 to 11:20 | work | work | rest | work | 3 |
| 11:20 to 11:30 | work | work | work | work | 4 |
| The Number of Working Shifts | 10 | 10 | 10 | 10 | |

TABLE 6

In the case where there are constraint conditions

| Time Slot | Operator 1 | Operator 2 | Operator 3 | Operator 4 | The Number of Necessary Operators |
|---|---|---|---|---|---|
| 9:00 to 9:10 | work | rest | rest | work | 2 |
| 9:10 to 9:20 | work | rest | rest | work | 2 |
| 9:20 to 9:30 | work | rest | work | rest | 2 |
| 9:30 to 9:40 | rest | work | work | rest | 2 |
| 9:40 to 9:50 | rest | work | work | rest | 2 |
| 9:50 to 10:00 | rest | work | work | work | 3 |
| 10:00 to 10:10 | work | work | work | work | 4 |
| 10:10 to 10:20 | work | work | work | work | 4 |
| 10:20 to 10:30 | work | work | work | rest | 3 |
| 10:30 to 10:40 | work | work | work | rest | 3 |
| 10:40 to 10:50 | rest | work | rest | work | 2 |
| 10:50 to 11:00 | rest | work | rest | work | 2 |
| 11:00 to 11:10 | work | rest | rest | work | 2 |
| 11:10 to 11:20 | work | rest | work | work | 3 |
| 11:20 to 11:30 | work | work | work | work | 4 |
| The Number of Working Shifts | 10 | 10 | 10 | 10 | |

As shown above, in the case where there is no constraint, working shifts are fragmentary, and there are many portions where "work→rest→work→rest" are repeated at intervals of 10 minutes. Thus, the timetable is not realistic.

In contrast, in the case where the constraint was considered, the working shifts are basically continuous, and the same type of work can be carried out for a certain length of time. Thus, the timetable is realistic.

Next, the result (Table 7) of creating a schedule on the premise that there is no constraint condition regarding discontinuous work (Expression 16: Too many holidays shall not be continued in a row) and a schedule (Table 8) for the case where the constraint condition is solved are shown. Note that here is shown an example of results of the constraint condition regarding discontinuous work in work shifts of a month. An example of an expression of the constraint condition considered this time is shown below. This time, the "work type" is not mentioned, and thus, the variable x_(i,j) in which the subscript (k) related to the work type is omitted is considered. Here, the symbol A is an adjusted integer.

[Expression 16]

$$\min - \sum_{i=1}^{4}\sum_{j=2}^{14}(1 - x_{i,j-1})(1 - x_{i,j}) + A\sum_{i=1}^{4}\sum_{j=3}^{14}\prod_{l=j-2}^{j}(1 - x_{i,j}) \quad \text{Expression 16}$$

TABLE 7

In the case where there are no constraint conditions

| Day | Operator 1 | Operator 2 | Operator 3 | Operator 4 | The Number of Necessary Operators |
|---|---|---|---|---|---|
| 1st | work | holiday | work | work | 3 |
| 2nd | work | holiday | work | work | 3 |
| 3rd | work | holiday | work | work | 3 |
| 4th | work | holiday | work | holiday | 2 |
| 5th | work | work | work | holiday | 3 |
| 6th | work | work | work | holiday | 3 |
| 7th | work | work | work | holiday | 3 |
| 8th | work | work | holiday | work | 3 |
| 9th | work | work | holiday | work | 3 |
| 10th | work | work | holiday | work | 3 |
| 11th | holiday | work | holiday | work | 2 |
| 12th | holiday | work | work | work | 3 |
| 13th | holiday | work | work | work | 3 |
| 14th | holiday | work | work | work | 3 |
| The Number of Working Shifts | 10 | 10 | 10 | 10 | |

TABLE 8

In the case where there are constraint conditions

| Day | Operator 1 | Operator 2 | Operator 3 | Operator 4 | The Number of Necessary Operators |
|---|---|---|---|---|---|
| 1st | holiday | work | work | work | 3 |
| 2nd | holiday | work | work | work | 3 |
| 3rd | work | work | holiday | work | 3 |
| 4th | work | work | holiday | holiday | 2 |
| 5th | work | work | work | holiday | 3 |
| 6th | work | holiday | work | work | 3 |
| 7th | work | holiday | work | work | 3 |
| 8th | holiday | work | work | work | 3 |
| 9th | holiday | work | work | work | 3 |
| 10th | work | work | holiday | work | 3 |

TABLE 8-continued

In the case where there are constraint conditions

| Day | Operator 1 | Operator 2 | Operator 3 | Operator 4 | The Number of Necessary Operators |
|---|---|---|---|---|---|
| 11th | work | work | holiday | holiday | 2 |
| 12th | work | holiday | work | work | 3 |
| 13th | work | holiday | work | work | 3 |
| 14th | work | work | work | holiday | 3 |
| The Number of Working Shifts | 10 | 10 | 10 | 10 | |

As shown above, in the case where there is no constraint, work days or holidays continue more than necessary, and the work shifts include "10 consecutive work days" and "4 consecutive holidays", the work shifts of the month is unrealistic also in terms of laws, office rules, and burdens on each operator. In contrast, in the case where the constraint was considered, consecutive work days and consecutive holidays are randomly arranged to an appropriate degree. Thus, the work shifts of the month are realistic.

Next, the result (Table 9) of creating a schedule on the premise that there is no constraint condition regarding prohibited patterns (Expression 17: An early shift on the next day of a late shift shall be prohibited) and a schedule (Table 10) for the case where the constraint condition is solved are shown. Here is shown an example of results of the constraint condition regarding a prohibited pattern in work shifts of a month. An example of an expression of the constraint condition considered this time is shown below. Since this time, of the "work types", only the early shift (k=1) and the late shift (k=2) are mentioned, the number of the subscript (k) concerning the work type considered here is up to 2.

[Expression 17]

$$\min \sum_{i=1}^{4} \sum_{j=2}^{14} x_{i,j-1,2} x_{i,j,1}$$

Expression 17

This constraint condition means that "an early shift is not to be assigned on the next day of a late shift".

TABLE 9

In the case where there are no constraint conditions

| Day | Operator 1 | Operator 2 | Operator 3 | Operator 4 | Early Shift | Late Shift |
|---|---|---|---|---|---|---|
| 1st | holiday | early shift | early shift | ▲late shift | 2 | 1 |
| 2nd | holiday | early shift | ▲late shift | early shift | 2 | 1 |
| 3rd | ▲late shift | early shift | holiday | early shift | 2 | 1 |
| 4th | early shift | ▲late shift | holiday | holiday | 1 | 1 |
| 5th | early shift | early shift | ▲late shift | holiday | 2 | 1 |
| 6th | ▲late shift | holiday | early shift | early shift | 2 | 1 |
| 7th | early shift | holiday | early shift | ▲late shift | 2 | 1 |
| 8th | holiday | early shift | ▲late shift | early shift | 2 | 1 |
| 9th | holiday | ▲late shift | early shift | early shift | 2 | 1 |
| 10th | ▲late shift | early shift | holiday | early shift | 2 | 1 |
| 11th | early shift | ▲late shift | holiday | holiday | 1 | 1 |
| 12th | early shift | holiday | early shift | ▲late shift | 2 | 1 |
| 13th | early shift | holiday | early shift | ▲late shift | 2 | 1 |
| 14th | early shift | early shift | ▲late shift | holiday | 2 | 1 |
| Days of Early Shift | 7 | 7 | 6 | 6 | | |
| Days of Late Shift | 3 | 3 | 4 | 4 | | |

TABLE 10

In the case where there are constraint conditions

| Day | Operator 1 | Operator 2 | Operator 3 | Operator 4 | Early Shift | Late Shift |
|---|---|---|---|---|---|---|
| 1st | holiday | early shift | ▲late shift | early shift | 2 | 1 |
| 2nd | holiday | early shift | ▲late shift | early shift | 2 | 1 |
| 3rd | early shift | early shift | holiday | ▲late shift | 2 | 1 |
| 4th | early shift | ▲late shift | holiday | holiday | 1 | 1 |
| 5th | early shift | ▲late shift | early shift | holiday | 2 | 1 |
| 6th | ▲late shift | holiday | early shift | early shift | 2 | 1 |
| 7th | ▲late shift | holiday | early shift | early shift | 2 | 1 |
| 8th | holiday | early shift | ▲late shift | early shift | 2 | 1 |
| 9th | holiday | early shift | ▲late shift | early shift | 2 | 1 |
| 10th | early shift | early shift | holiday | ▲late shift | 2 | 1 |
| 11th | early shift | ▲late shift | holiday | holiday | 1 | 1 |
| 12th | early shift | holiday | early shift | ▲late shift | 2 | 1 |
| 13th | early shift | holiday | early shift | ▲late shift | 2 | 1 |
| 14th | ▲late shift | early shift | early shift | holiday | 2 | 1 |

TABLE 10-continued

In the case where there are constraint conditions

| Day | Operator 1 | Operator 2 | Operator 3 | Operator 4 | The Number of Necessary Operators | |
|---|---|---|---|---|---|---|
| | | | | | Early Shift | Late Shift |
| Days of Early Shift | 7 | 7 | 6 | 6 | | |
| Days of Late Shift | 3 | 3 | 4 | 4 | | |

In the above tables, a symbol ▲ is prefixed to each late shift to make it easy to distinguish. As shown above, in the case where there is no constraint, there are many portions where an early shift is assigned on the next day of a late shift. It means that before the operator takes enough rest, the operator has to work on the next day. Thus, the work shifts of the month are not realistic. In contrast, in the case where the constraint was considered, either a late shift or a holiday is assigned on the next day of a late shift. Thus, the work shifts of the month are realistic.

Next, the result (Table 11) of creating a schedule on the premise that there is no constraint condition regarding the compatibility between operators (Expression 18: Combinations of only recruits shall be avoided & an instructor shall be combined) and a schedule (Table 12) for the case where the constraint conditions are solved are shown. Here is shown an example of results of the constraint conditions regarding the compatibility between operators in work shifts of a month.

Here, this time, the "work type" is not mentioned, and thus, the variable x_(i,j) in which the subscript (k) related to the work type is omitted is considered. Here, the symbols A and B are adjusted integers.

[Expression 18]

$$\min \sum_{j=1}^{14} x_{3,j} x_{4,j} - A \sum_{j=1}^{14} x_{1,j} x_{3,j} - B \sum_{j=1}^{14} x_{2,j} x_{4,j} \qquad \text{Expression 18}$$

TABLE 11

In the case where there are no constraint conditions

| Day | Operator 1 (Expert A) Instructor for Recruit A | Operator 2 (Expert B) Instructor for Recruit B | Operator 3 (Recruit A) | Operator 4 (Recruit B) | The Number of Necessary Operators |
|---|---|---|---|---|---|
| 1st | work | holiday | work | work | 3 |
| 2nd | work | holiday | work | work | 3 |
| 3rd | work | work | holiday | holiday | 2 |
| 4th | holiday | work | holiday | work | 2 |
| 5th | holiday | work | work | work | 3 |
| 6th | work | work | holiday | holiday | 2 |
| 7th | work | work | holiday | holiday | 2 |
| 8th | work | holiday | work | work | 3 |
| 9th | work | holiday | work | work | 3 |
| 10th | work | work | holiday | holiday | 2 |
| 11th | holiday | work | work | holiday | 2 |
| 12th | work | work | holiday | work | 3 |
| 13th | work | work | holiday | holiday | 2 |
| 14th | holiday | work | work | holiday | 2 |
| The Number of Working Shifts | 10 | 10 | 7 | 7 | |

TABLE 12

In the case where there are constraint conditions

| Day | Operator 1 (Expert A) Instructor for Recruit A | Operator 2 (Expert B) Instructor for Recruit B | Operator 3 (Recruit A) | Operator 4 (Recruit B) | The Number of Necessary Operators |
|---|---|---|---|---|---|
| 1st | work | work | holiday | work | 3 |
| 2nd | work | work | work | holiday | 3 |
| 3rd | work | holiday | work | holiday | 2 |
| 4th | holiday | work | holiday | work | 2 |
| 5th | work | work | holiday | work | 3 |
| 6th | holiday | work | holiday | work | 2 |
| 7th | work | holiday | work | holiday | 2 |
| 8th | work | work | work | holiday | 3 |
| 9th | work | work | work | holiday | 3 |
| 10th | holiday | work | holiday | work | 2 |
| 11th | holiday | work | holiday | work | 2 |
| 12th | work | work | holiday | work | 3 |
| 13th | work | holiday | work | holiday | 2 |
| 14th | work | holiday | work | holiday | 2 |
| The Number of Working Shifts | 10 | 10 | 7 | 7 | |

As above, in the case where there is no constraint, there are "days on which two recruits attend at work on the same day", "days on which recruit A attends at work but operator 1 who is the instructor for recruit A does not", and "days on which recruit B attends at work but operator 2 who is the instructor for recruit B does not". The work shifts of the month are not realistic. In contrast, in the case where the constraints were considered, the number of recruits that attend at work on each day is only one, and on the day when a recruit attends at work, the recruit's instructor always attends. Thus, the work shifts of the month are realistic.

Next, the result (Table 13) of creating a schedule on the premise that there is no constraint condition regarding reflection of operators' requests (Expression 19: Operator 2 wants to take holidays during the period from 1st to 7th & operator 3 wants to work on early shifts & operator 4 wants to work on late shifts) and a schedule (Table 14) for the case where the constraint conditions are solved are shown.

[Expression 19]

$$\min - \sum_{j=1}^{7} (1 - x_{2,j,k}) - A \sum_{j=1}^{14} x_{3,j,1} - B \sum_{j=1}^{14} x_{4,j,2} \qquad \text{Expression 19}$$

These constraint conditions mean "operator 2 wants to take holidays in the first half of the period (1st to 7th)", "operator 3 wants to work on early shifts to the extent possible", and "operator 4 wants to work on late shifts to the extent possible".

TABLE 13

In the case where there are no constraint conditions

| Day | Operator 1 (no requests) | Operator 2 (wants to take holidays in the first half of the period) | Operator 3 (wants to work on early shifts) | Operator 4 (wants to work on late shifts) | The Number of Necessary Operators Early Shift | Late Shift |
|---|---|---|---|---|---|---|
| 1st | holiday | early shift | ▲late shift | early shift | 2 | 1 |
| 2nd | holiday | early shift | ▲late shift | early shift | 2 | 1 |
| 3rd | early shift | early shift | holiday | ▲late shift | 2 | 1 |
| 4th | early shift | ▲late shift | holiday | holiday | 1 | 1 |
| 5th | early shift | ▲late shift | early shift | holiday | 2 | 1 |
| 6th | ▲late shift | holiday | early shift | early shift | 2 | 1 |
| 7th | ▲late shift | holiday | early shift | early shift | 2 | 1 |
| 8th | holiday | early shift | ▲late shift | early shift | 2 | 1 |
| 9th | holiday | early shift | ▲late shift | early shift | 2 | 1 |
| 10th | early shift | early shift | holiday | ▲late shift | 2 | 1 |
| 11th | early shift | ▲late shift | holiday | holiday | 1 | 1 |
| 12th | early shift | holiday | early shift | ▲late shift | 2 | 1 |
| 13th | early shift | holiday | early shift | ▲late shift | 2 | 1 |
| 14th | ▲late shift | early shift | early shift | holiday | 2 | 1 |
| The Number of Working Shifts | 10 | 10 | 10 | 10 | | |

TABLE 14

In the case where there are constraint conditions

| Day | Operator 1 (no requests) | Operator 2 (wants to take holidays in the first half of the period) | Operator 3 (wants to work on early shifts) | Operator 4 (wants to work on late shifts) | The Number of Necessary Operators Early Shift | Late Shift |
|---|---|---|---|---|---|---|
| 1st | early shift | holiday | early shift | ▲late shift | 2 | 1 |
| 2nd | early shift | holiday | early shift | ▲late shift | 2 | 1 |
| 3rd | holiday | early shift | early shift | ▲late shift | 2 | 1 |
| 4th | early shift | ▲late shift | holiday | holiday | 1 | 1 |
| 5th | early shift | holiday | early shift | ▲late shift | 2 | 1 |
| 6th | early shift | holiday | early shift | ▲late shift | 2 | 1 |
| 7th | ▲late shift | early shift | early shift | holiday | 2 | 1 |

TABLE 14-continued

In the case where there are constraint conditions

| Day | Operator 1<br>(no requests) | Operator 2<br>(wants to take holidays in the first half of the period) | Operator 3<br>(wants to work on early shifts) | Operator 4<br>(wants to work on late shifts) | The Number of Necessary Operators | |
|---|---|---|---|---|---|---|
| | | | | | Early Shift | Late Shift |
| 8th | ▲late shift | early shift | early shift | holiday | 2 | 1 |
| 9th | holiday | early shift | early shift | ▲late shift | 2 | 1 |
| 10th | early shift | early shift | holiday | ▲late shift | 2 | 1 |
| 11th | ▲late shift | early shift | holiday | holiday | 1 | 1 |
| 12th | holiday | early shift | early shift | ▲late shift | 2 | 1 |
| 13th | holiday | early shift | early shift | ▲late shift | 2 | 1 |
| 14th | early shift | early shift | holiday | ▲late shift | 2 | 1 |
| The Number of Working Shifts | 10 | 10 | 10 | 10 | | |

In the above tables, a symbol ▲ is prefixed to each late shift to make it easy to distinguish.

As shown above, in the case where there is no constraint, "there are holidays for operator 2 also in the latter half of the period", "late shifts are assigned to operator 3", "early shifts are assigned to operator 4". Thus, the work shifts of the month are far from operators' requests. In contrast, in the case where the constraints are considered, the work shifts of the month reflect the operators' requests.

Next, the result (Table 15) of creating a schedule on the premise that there is no constraint condition regarding equal work between operators (Expression 20: The number of working hours shall be equal between operators) and a schedule (Table 16) for the case where the constraint condition is solved are shown.

[Expression 20]

$$\min - \sum_{i=1}^{4}\left[\sum_{j=1}^{15} x_{i,j} - D\right]^2 \quad \text{Expression 20}$$

This constraint condition means that "the number of working shifts of each operator shall be set to as close to a guideline D as possible.

TABLE 15

In the case where there are no constraint conditions

| Time Slot | Operator 1 | Operator 2 | Operator 3 | Operator 4 | The Number of Necessary Operators |
|---|---|---|---|---|---|
| 9:00 to 9:10 | work | work | holiday | holiday | 2 |
| 9:10 to 9:20 | work | work | holiday | holiday | 2 |
| 9:20 to 9:30 | work | work | holiday | holiday | 2 |
| 9:30 to 9:40 | work | work | holiday | holiday | 2 |

TABLE 15-continued

In the case where there are no constraint conditions

| Time Slot | Operator 1 | Operator 2 | Operator 3 | Operator 4 | The Number of Necessary Operators |
|---|---|---|---|---|---|
| 9:40 to 9:50 | work | work | work | holiday | 3 |
| 9:50 to 10:00 | work | work | work | holiday | 3 |
| 10:00 to 10:10 | work | work | work | work | 4 |
| 10:10 to 10:20 | work | work | work | work | 4 |
| 10:20 to 10:30 | work | work | work | work | 4 |
| 10:30 to 10:40 | work | work | work | holiday | 3 |
| 10:40 to 10:50 | work | work | work | holiday | 3 |
| 10:50 to 11:00 | work | work | holiday | holiday | 2 |
| 11:00 to 11:10 | work | work | holiday | holiday | 2 |
| 11:10 to 11:20 | work | work | work | holiday | 3 |
| 11:20 to 11:30 | work | work | work | holiday | 3 |
| Actual Number of Working Shifts | 15 | 15 | 9 | 3 | |
| Guideline of The Number of Working Shifts | 10 | 10 | 10 | 10 | |

TABLE 16

In the case where there are constraint conditions

| Time Slot | Operator 1 | Operator 2 | Operator 3 | Operator 4 | The Number of Necessary Operators |
|---|---|---|---|---|---|
| 9:00 to 9:10 | work | rest | rest | work | 2 |
| 9:10 to 9:20 | work | rest | rest | work | 2 |
| 9:20 to 9:30 | work | rest | work | rest | 2 |
| 9:30 to 9:40 | rest | work | work | rest | 2 |
| 9:40 to 9:50 | rest | work | work | work | 3 |
| 9:50 to 10:00 | rest | work | work | work | 3 |
| 10:00 to 10:10 | work | work | work | work | 4 |
| 10:10 to 10:20 | work | work | work | work | 4 |
| 10:20 to 10:30 | work | work | work | work | 4 |
| 10:30 to 10:40 | work | work | work | rest | 3 |
| 10:40 to 10:50 | rest | work | work | work | 3 |
| 10:50 to 11:00 | rest | work | rest | work | 2 |
| 11:00 to 11:10 | work | rest | rest | work | 2 |
| 11:10 to 11:20 | work | rest | work | work | 3 |
| 11:20 to 11:30 | work | work | work | rest | 3 |
| Actual Number of Working Shifts | 10 | 10 | 11 | 11 | |
| Guideline of The Number of Working Shifts | 10 | 10 | 10 | 10 | |

As shown above, in the case where there is no constraint, the working hours are uneven between operators, and the table shows a mixture of operators having no rest time and operators having too many rests. Thus, the timetable is unrealistic. In contrast, in the case where the constraint was considered, the number of working hours is approximately equal between operators. Thus, the timetable is fair and realistic.

Note that, for example, it will be preferable if in case of emergency, such as a shortage of operators due to a sudden demand increase or abrupt absence of operators, the schedule creation assisting device 100 obtains a constraint condition corresponding to the event from the user terminal 200 and executes the foregoing procedure.

As a constraint condition in such a situation, for example, a constraint condition on the premise in which an operator who is allocated to a different operation in the same time slot on the same day in the latest created schedule is to "attend at work" or like conditions can be assumed.

In that case, the schedule creation assisting device 100 executes step s11 according to the constraint condition to generate a constraint condition function, and solves an Ising model regarding the corresponding objective function.

Although the best mode and the like for carrying out the present invention has been specifically described above, the present invention is not limited to these, but various modifications can be made without departing from the spirit of the invention.

The present embodiment described above makes it possible to create a schedule efficiently considering nonlinear constraint conditions regarding a large number of workers who work in cooperation.

The description of the present specification makes at least the following things clear. Specifically, in the schedule creation assisting device of the present embodiment, the computation unit may include, in the terms of the objective function, the constraint condition function concerning at least one of an upper limit or a lower limit of continuous working time length, seeking to increase continuous work, and restricting continuous work, which are the constraint conditions regarding continuous work, and compute the Ising model.

This makes it possible to efficiently create a schedule that minimizes labor costs and in which conditions regarding continuous work of each worker (Example: The workers' requests and the rules of their organization. The same applies in the following) are taken into account as much as possible. This in turn makes it possible to create more efficiently a schedule with nonlinear constraint conditions taken into account for a large number of workers who work in cooperation.

In the schedule creation assisting device of the present embodiment, the computation unit may include, in the terms of the objective function, the constraint condition function concerning at least one of an upper limit or a lower limit of intervals of work timings, seeking to increase consecutive holidays, and restricting consecutive holidays, which are the constraint conditions regarding discontinuous work, and compute the Ising model.

This makes it possible to efficiently create a schedule that minimizes labor costs and in which conditions regarding discontinuous work of each worker are taken into account as much as possible. This in turn makes it possible to create more efficiently a schedule with nonlinear constraint conditions taken into account for a large number of workers who work in cooperation.

In the schedule creation assisting device of the present embodiment, the computation unit may include, in the terms of the objective function, the constraint condition function concerning at least one of prohibition of continuous work in a specified time slot and prohibition of work in a predetermined time slot immediately after working in the specified time slot, which are the constraint conditions regarding a prohibited pattern, and compute the Ising model.

This makes it possible to efficiently create a schedule that minimizes labor costs and in which conditions regarding prohibited patterns of work for each worker (Example: A day shift immediately after a midnight shift shall be prohibited) are taken into account as much as possible. This in turn makes it possible to create more efficiently a schedule with nonlinear constraint conditions taken into account for a large number of workers who work in cooperation.

In the schedule creation assisting device of the present embodiment, the computation unit may include, in the terms of the objective function, the constraint condition function concerning at least one of seeking a state in which workers having specified attributes work at the same time or avoiding the state, which are the constraint conditions regarding the compatibility of workers, and compute the Ising model.

This makes it possible to efficiently create a schedule that minimizes labor costs and in which conditions regarding the compatibility of each worker with other workers (Example: A recruit and a worker capable of giving instruction to the recruit shall attend at work on the same shift. A worker and a certain worker shall not attend at work on the same shift)

are taken into account as much as possible. This in turn makes it possible to create more efficiently a schedule with nonlinear constraint conditions taken into account for a large number of workers who work in cooperation.

In the schedule creation assisting device of the present embodiment, the computation unit may include, in the terms of the objective function, the constraint condition function concerning seeking work shifts in a specified pattern, which is the constraint condition regarding workers' requests, and compute the Ising model.

This makes it possible to efficiently create a schedule that minimizes labor costs and in which conditions regarding requests from each worker (Example: A certain shift should be assigned if possible on a specified day) are taken into account as much as possible. This in turn makes it possible to create more efficiently a schedule with nonlinear constraint conditions taken into account for a large number of workers who work in cooperation.

In the schedule creation assisting device of the present embodiment, the computation unit may include, in the terms of the objective function, the constraint condition function concerning seeking a state in which the work time length in each work pattern is equal between the workers, which is the constraint condition regarding equality between workers, and compute the Ising model.

This makes it possible to efficiently create a schedule that minimizes labor costs and in which conditions regarding equality between workers are taken into account as much as possible. This in turn makes it possible to create more efficiently a schedule with nonlinear constraint conditions taken into account for a large number of workers who work in cooperation.

The schedule creation assisting device of the present embodiment may be a CMOS annealing machine that solves a combinatorial optimization problem regarding the Ising model.

This makes it possible to efficiently calculate, at room temperature, a practical solution of a combinatorial optimization problem with constraint conditions affecting one another, in other words, nonlinear constraint conditions taken into account, by simulating the operation of an Ising model, using a circuit including semiconductors such as devices of complementary metal oxide semiconductors (CMOS) or the like. This in turn makes it possible to create much more efficiently a schedule with nonlinear constraint conditions taken into account for a large number of workers who work in cooperation.

In the schedule creation assisting method in the present embodiment, the information processing device may include, in the terms of the objective function, the constraint condition function concerning at least one of an upper limit or a lower limit of continuous working time length, seeking to increase continuous work, and restricting continuous work, which are the constraint conditions regarding continuous work, and compute the Ising model.

In the schedule creation assisting method in the present embodiment, the information processing device may include, in the terms of the objective function, the constraint condition function concerning at least one of an upper limit or a lower limit of intervals of work timings, seeking to increase consecutive holidays, and restricting consecutive holidays, which are the constraint conditions regarding discontinuous work, and compute the Ising model.

In the schedule creation assisting method in the present embodiment, the information processing device may include, in the terms of the objective function, the constraint condition function concerning at least one of prohibition of continuous work in a specified time slot and prohibition of work in a predetermined time slot immediately after working in the specified time slot, which are the constraint conditions regarding a prohibited pattern, and compute the Ising model.

In the schedule creation assisting method in the present embodiment, the information processing device may include, in the terms of the objective function, the constraint condition function concerning at least one of seeking a state in which workers having specified attributes work at the same time or avoiding the state, which are the constraint conditions regarding the compatibility of workers, and compute the Ising model.

In the schedule creation assisting method in the present embodiment, the information processing device may include, in the terms of the objective function, the constraint condition function concerning seeking work shifts in a specified pattern, which is the constraint condition regarding workers' requests, and compute the Ising model.

In the schedule creation assisting method in the present embodiment, the information processing device may include, in the terms of the objective function, the constraint condition function concerning seeking a state in which the work time length in each work pattern is equal between the workers, which is the constraint condition regarding equality between workers, and compute the Ising model.

In the schedule creation assisting method in the present embodiment, the information processing device may be a CMOS annealing machine that solves a combinatorial optimization problem regarding the Ising model.

REFERENCE SIGNS LIST 10 network
100 schedule creation assisting device (annealing machine)
101 storage unit
102 program
1021 Ising model
103 memory
104 computation unit
105 communication unit
125 basic information table
126 constraint condition table
200 user terminal

The invention claimed is:

1. A schedule creation assisting device comprising one or more memory devices having a program stored therein that, when executed by one or more processors, cause the one or more processors to:
  store information on a total working time length in a specified period of each of workers who work in cooperation in a specified operation, a number of the workers necessary at each timing during the specified period, and a constraint condition regarding allocation of the workers to the specified operation; and
  compute an Ising model, regarding an objective function including, as terms, the total working time length in the specified period, the number of necessary workers, and a constraint condition function that is minimized when the constraint condition is satisfied, wherein whether each of the workers is to attend work is set as a spin, and a sensitivity between variables of the constraint condition function is set as an intensity of interaction between the spins;
  identify a ground state of the Ising model in which the objective function is satisfied; and generate an output indicating a schedule for the workers, in a specified device, by associating a first set of spins having a first spin state in the ground state of the Ising model with a first set of workers to attend work and associating a second set of spins having a second spin state in the ground state of the Ising model with a second set of workers to not attend work.

2. The schedule creation assisting device according to claim 1, wherein:
the constraint condition includes a continuous working time length; and
the constraint condition function is associated with at least one of setting an upper limit or a lower limit of the continuous working time length, seeking to increase the continuous working time length, and restricting the continuous working time length.

3. The schedule creation assisting device according to claim 1, wherein:
the constraint condition includes discontinuous work; and
the constraint condition function is associated with at least one of setting an upper limit or a lower limit of intervals of work timings, seeking to increase consecutive holidays, and restricting consecutive holidays.

4. The schedule creation assisting device according to claim 1, wherein:
the constraint condition includes a prohibited pattern; and
the constraint condition function is associated with at least one of prohibition of continuous work in a specified time slot and prohibition of work in a predetermined time slot immediately after working in the specified time slot.

5. The schedule creation assisting device according to claim 1, wherein:
the constraint condition includes compatibility of workers; and
the constraint condition function is associated with at least one of seeking a state in which workers having specified attributes work at the same time or avoiding the state.

6. The schedule creation assisting device according to claim 1, wherein:
the constraint condition includes a worker's request; and
the constraint condition function is associated with seeking work shifts in a specified pattern.

7. The schedule creation assisting device according to claim 1, wherein:
the constraint condition includes equality of working hours among workers; and
the constraint condition function is associated with seeking a state in which the work time length in each work pattern is equal between the workers.

8. The schedule creation assisting device according to claim 1,
wherein the schedule creation assisting device is a CMOS annealing machine that solves a combinatorial optimization problem regarding the Ising model.

9. A schedule creation assisting method comprising:
storing information on a total working time length in a specified period of each of workers who work in cooperation in a specified operation, a number of the workers necessary at each timing during the specified period, and a constraint condition regarding allocation of the workers to the specified operation;
computing an Ising model, regarding an objective function including, as terms, the total working time length in the specified period, the number of necessary workers, and a constraint condition function that is minimized when the constraint condition is satisfied, wherein whether each of the workers is to attend work is set as a spin, and a sensitivity between variables of the constraint condition function is set as an intensity of interaction between the spins;
identifying a ground state of the Ising model in which the objective function is satisfied; and
generating an output indicating a schedule for the workers, in a specified device, by associating a first set of spins having a first spin state in the ground state of the Ising model with a first set of workers to attend work and associating a second set of spins having a second spin state in the ground state of the Ising model with a second set of workers to not attend work.

10. The schedule creation assisting method according to claim 9, wherein:
the constraint condition includes a continuous working time length; and
the constraint condition function is associated with at least one of setting an upper limit or a lower limit of the continuous working time length, seeking to increase the continuous working time length, and restricting the continuous working time length.

11. The schedule creation assisting method according to claim 9, wherein:
the constraint condition includes discontinuous work; and
the constraint condition function is associated with at least one of setting an upper limit or a lower limit of intervals of work timings, seeking to increase consecutive holidays, and restricting consecutive holidays.

12. The schedule creation assisting method according to claim 9, wherein:
the constraint condition includes a prohibited pattern; and
the constraint condition function is associated with at least one of prohibition of continuous work in a specified time slot and prohibition of work in a predetermined time slot immediately after working in the specified time slot.

13. The schedule creation assisting method according to claim 9, wherein:
the constraint condition includes compatibility of workers; and
the constraint condition function is associated with at least one of seeking a state in which workers having specified attributes work at the same time or avoiding the state.

14. The schedule creation assisting method according to claim 9, wherein:
the constraint condition includes a worker's request; and
the constraint condition function is associated with seeking work shifts in a specified pattern.

15. The schedule creation assisting method according to claim 9, wherein:
the constraint condition includes equality of working hours among workers; and
the constraint condition function is associated with seeking a state in which the work time length in each work pattern is equal between the workers.

16. The schedule creation assisting method according to claim 9, wherein the information processing device is a CMOS annealing machine that solves a combinatorial optimization problem regarding the Ising model.

* * * * *